United States Patent
Aceto et al.

(10) Patent No.: US 11,505,980 B2
(45) Date of Patent: Nov. 22, 2022

(54) MOTORIZED ACTUATOR AND MOVABLE BARRIER PROVIDED WITH SAID ACTUATOR, PARTICULARLY SUITABLE FOR AUXILIARY OR EMERGENCY DRIVES

(71) Applicant: FAAC S.P.A., Zola Predosa (IT)

(72) Inventors: Danilo Aceto, Zola Predosa (IT); Samuele Magnoni, Bologna (IT)

(73) Assignee: FAAC S.P.A., Zola Predosa (IT)

( * ) Notice: Subject to any disclaimer, the term of this patent is extended or adjusted under 35 U.S.C. 154(b) by 161 days.

(21) Appl. No.: 16/870,042

(22) Filed: May 8, 2020

(65) Prior Publication Data
US 2020/0355010 A1 Nov. 12, 2020

(30) Foreign Application Priority Data
May 10, 2019 (IT) .......................... 102019000006733

(51) Int. Cl.
*E05F 11/24* (2006.01)
*E05F 15/63* (2015.01)

(52) U.S. Cl.
CPC ........ *E05F 15/63* (2015.01); *E05F 2015/631* (2015.01); *E05Y 2201/722* (2013.01); *E05Y 2900/132* (2013.01)

(58) Field of Classification Search
CPC ....... E05F 15/63; E05F 15/649; E05F 15/611; E05F 2015/631; E05F 1/10; E05F 1/1041;
(Continued)

(56) References Cited

U.S. PATENT DOCUMENTS

| | | | | |
|---|---|---|---|---|
| 4,685,348 | A * | 8/1987 | Takami | F16H 35/02 74/393 |
| 7,373,756 | B2 * | 5/2008 | Okulov | E05F 15/41 49/346 |

(Continued)

FOREIGN PATENT DOCUMENTS

| | | |
|---|---|---|
| EP | 2933415 A1 | 10/2015 |
| WO | 2012010111 A1 | 1/2012 |
| WO | 2015058035 A1 | 4/2015 |

OTHER PUBLICATIONS

Search Report and Written Opinion for Italian Application No. 102019000006733 dated Jan. 13, 2020.
(Continued)

*Primary Examiner* — Jerry E Redman
(74) *Attorney, Agent, or Firm* — Pearne & Gordon LLP

(57) ABSTRACT

The motorized drive according to the application is particularly suitable for auxiliary or emergency drives and is configured to open or close a wing of a barrier such as a door. The motorized drive includes a motor and a reduction unit through which the motor can open or close the wing, an auxiliary motor including a helical spring which is able to absorb mechanical energy during the opening of the wing and release it during the closing of the same, a reduction unit connecting the auxiliary motor to the wing. A first and a second toothed profile realize a gear with a variable transmission ratio. The first and/or the second toothed profile form at least one toothing having a pitch profile which is substantially non-circular or not formed by a simple arc of a circle or a straight line.

20 Claims, 26 Drawing Sheets

(58) Field of Classification Search
CPC ............ E05F 1/1246; E05Y 2201/722; E05Y 2900/132; E05Y 2201/618; E05Y 2201/71; E05Y 2201/712; E05Y 2201/716
USPC .................. 49/339, 340, 341, 342, 344, 346
See application file for complete search history.

(56) References Cited

U.S. PATENT DOCUMENTS

| | | | |
|---|---|---|---|
| 11,047,591 B2* | 6/2021 | Konrad | ................... F16H 33/02 |
| 11,098,517 B2* | 8/2021 | Yulkowski | ............ E05F 15/603 |
| 2016/0033024 A1 | 2/2016 | Yulkowski | |

OTHER PUBLICATIONS

Extended European Search Report for European Application No. 20173555.2 dated Oct. 1, 2020.

* cited by examiner

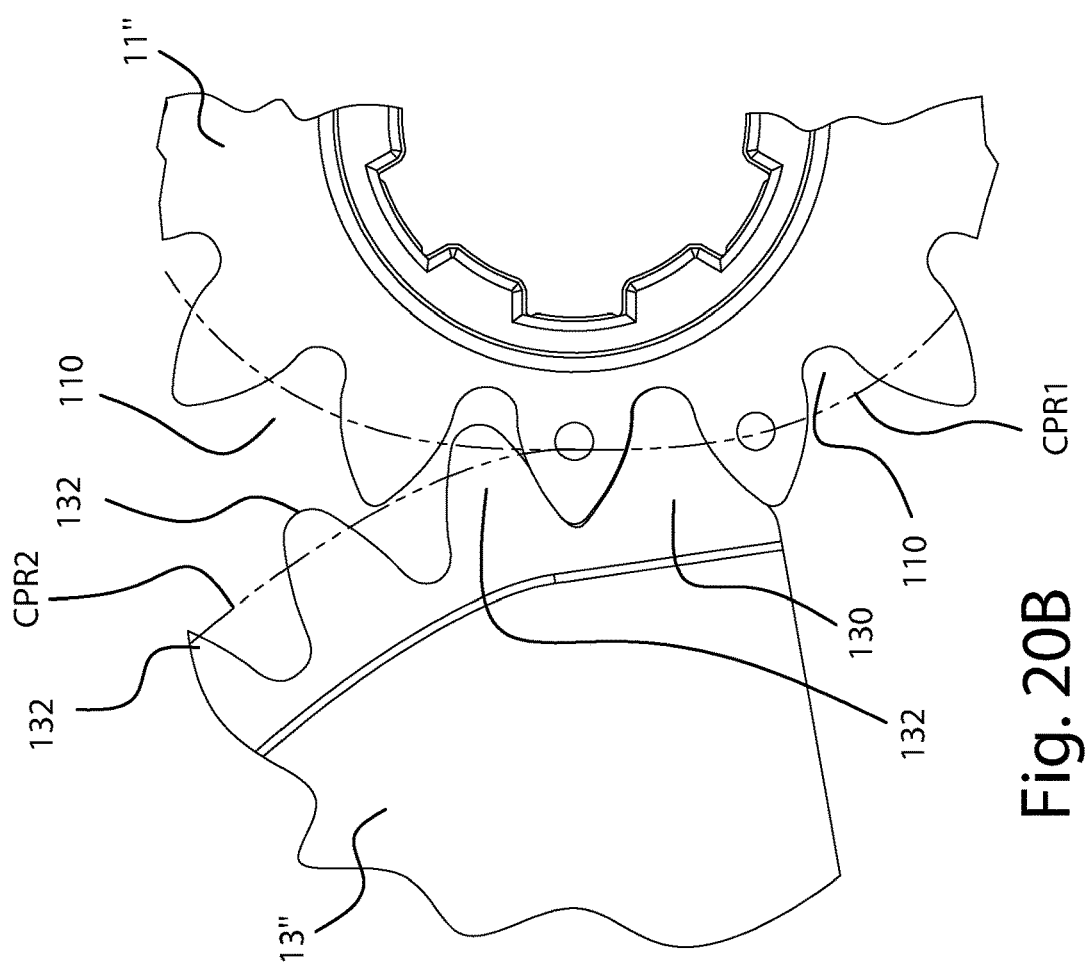
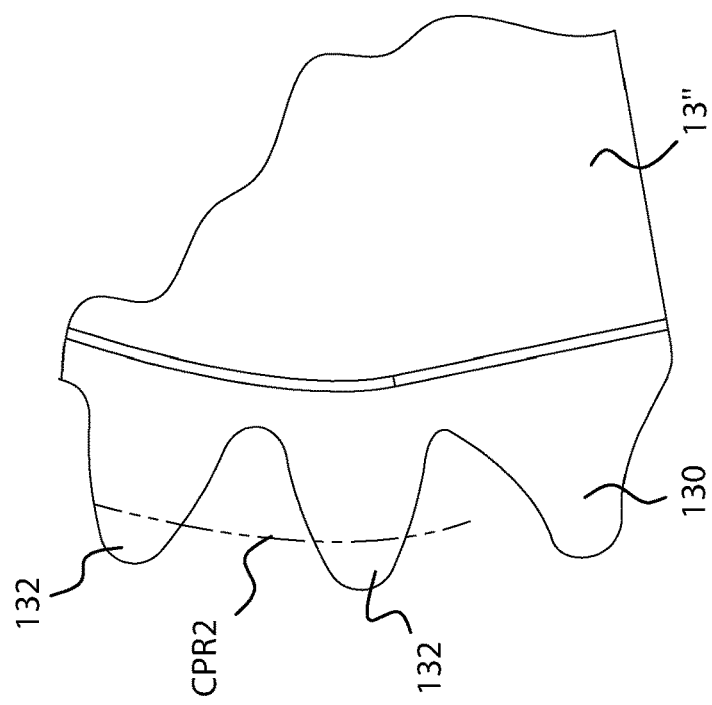
Fig. 20B
Fig. 20A

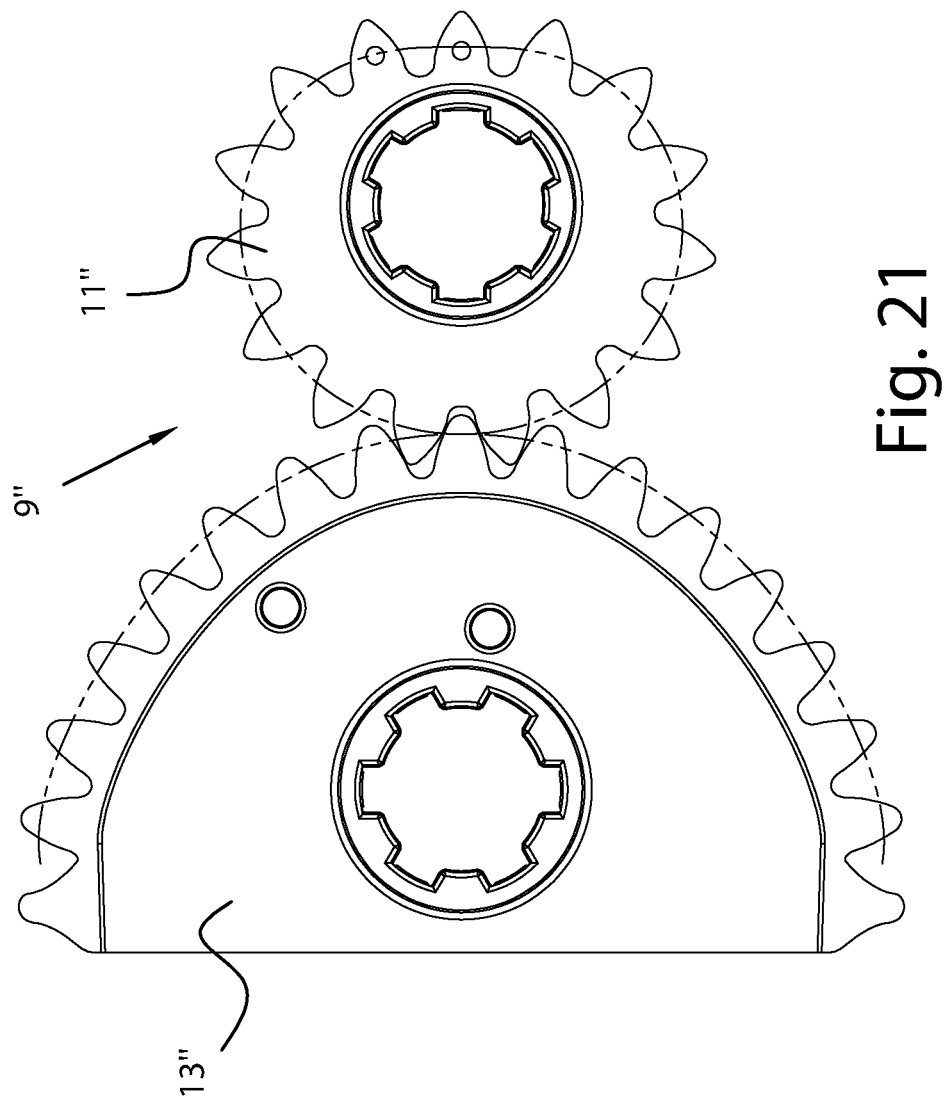

MOTORIZED ACTUATOR AND MOVABLE BARRIER PROVIDED WITH SAID ACTUATOR, PARTICULARLY SUITABLE FOR AUXILIARY OR EMERGENCY DRIVES

The present application claims the priority of the Italian patent application No. IT102019000006733, the content of which is incorporated in the present application by reference.

FIELD OF THE INVENTION

The present invention relates to a motorized drive for movable barriers such as doors, main doors, gates, swing shutters, sliding walls or partitions, and a movable barrier comprising said motorized drive.

Said drive is particularly suitable for use as an auxiliary or emergency actuator.

BACKGROUND

The wings of the common doors and main doors generally open by rotating about 90° or slightly more, requiring a variable torque from the possible actuator that operates them.

Generally said actuator comprises a rotary electric motor and a speed reduction unit generally comprising one or more circular wheel gears and/or worm screw systems.

Said rotary electric motor generally acts as the main motor: under conditions of normal operation said doors, main doors or, more generally, movable barriers are operated by said electric motor.

In the initial and final phases of the opening or closing movement, i.e. acceleration and deceleration, the wing requires relatively high torques and low rotation speeds from the motor of the actuator.

On the other hand, in the intermediate phase of the movement the torque that the motor must deliver is almost zero, only having to overcome the frictions present in the rotating pairs of the wings, while the rotation speed is high.

Currently said composite actuations comprising accelerations, decelerations and zero acceleration phases are carried out exclusively by piloting the electric motor of the actuator, in order to obtain the desired speed trend of the wing despite the different torque requirements, or with kinematic systems downstream of the electric motor.

The authors of the present invention have found that it would be desirable to make the resistant torque which the motor must overcome and the speed which it must reach at the various positions of the wing or in any case at the various instants of the drives more uniform: this would allow at least to adopt motors with lower rated power as well as kinematic systems with lower gear ratios downstream of the electric motor, all with the same weight and inertia of the wing to be operated, and of the frictions to be overcome.

In some applications, for example when a door or other movable barrier must be kept normally closed/opened respectively and must be respectively opened/closed only under particular conditions—for example it must be opened only to allow a person, a vehicle or other object to pass through and then closed, think for example of some doors of some hospital wards—it is desired to equip said movable barriers also with an auxiliary motor capable of closing/reopening respectively said movable barriers even under conditions of failure or lack of power supply of the main electric motor.

As an auxiliary motor, it is possible to think of adopting a spring, for example metallic, which however typically applies to the speed reducer of the actuator a strongly variable force or torque depending on the degree of compression and the spring itself.

Typically an ordinary spring, for example a compression spring, applies to the speed reducer a very high driving force or torque at the beginning of the closing or opening movement, and very low if not zero towards the end of said movement.

Therefore the wing or other movable barrier generally starts—or tends to start—its emergency closing or opening with a too abrupt and energetic movement, in some cases even dangerous for people and things nearby, and ends it weakly and slowly with a weak push, sometimes even without being able to finish it.

The emergency closing or opening movement is initially all the more abrupt the greater the elastic energy it is desired to store in the spring, which is generally the greater, the greater the weight and inertia of the wing or other movable barrier to operate.

In addition, the greater the elastic energy to be stored in the spring, the greater the torque that the main motor—for example electric—of the actuator must apply to compress the spring and therefore the greater the size and the rated power of the main motor.

The authors of the present invention have found that it would be desirable to make the resistant torque that the auxiliary motor of an actuator of a wing of a main door, partition or other movable barrier must overcome to open or close the movable barrier and compress the spring more uniform: this would allow at least to adopt auxiliary and main motors of lower rated power as well as kinematic systems with lower reduction ratios downstream of the electric motor, all with the same weight and inertia of the wing to be operated, and of the frictions to be overcome.

An object of the present invention is therefore to obviate the above mentioned drawbacks and in particular to provide a drive to open and/or close for example a wing of a door, gate, main door or swing shutter or still wall or sliding partition, wherein the resistant torque applied by the wing required from the motor—for example from the auxiliary motor—of the drive during the closing and/or opening movements to open and/or close the wing and to compress the spring is more uniform than the one applied by existing drives.

SUMMARY OF THE INVENTION

Said purpose is achieved, according to a first aspect of the present invention, with a motorized drive having a motor having a first reduction unit, and an auxiliary elastic energy motor having a second reduction unit, the first reduction unit comprising a first and second toothed profile that engage one another forming a gear with a variable transmission ratio, the second reduction unit comprising a first and second toothed profile that engage one another to form a gear. The first toothed profile of the second reduction unit and the second toothed profile of the first reduction unit being configured to be operated by both the electric motor and by the auxiliary elastic energy motor.

In a particular embodiment of the invention, said motorized drive comprises a motor driven by the release force of a spring or other elastic element, and the spring or other elastic element are configured to operate the second toothed profile 13' for example by pushing it or pulling it longitudinally to itself.

In a second aspect of the invention, this object is achieved with a movable barrier having a wing of at least one of a door, gate, or sliding partition, and a motorized drive configured to open and close said wing.

The dependent claims are directed to further features of the invention.

The advantages attainable with the present invention shall become more readily apparent, to the person skilled in the art, by the following detailed description of a particular, non-limiting embodiment, shown with reference to the following schematic figures.

LIST OF FIGURES

Figure 1:
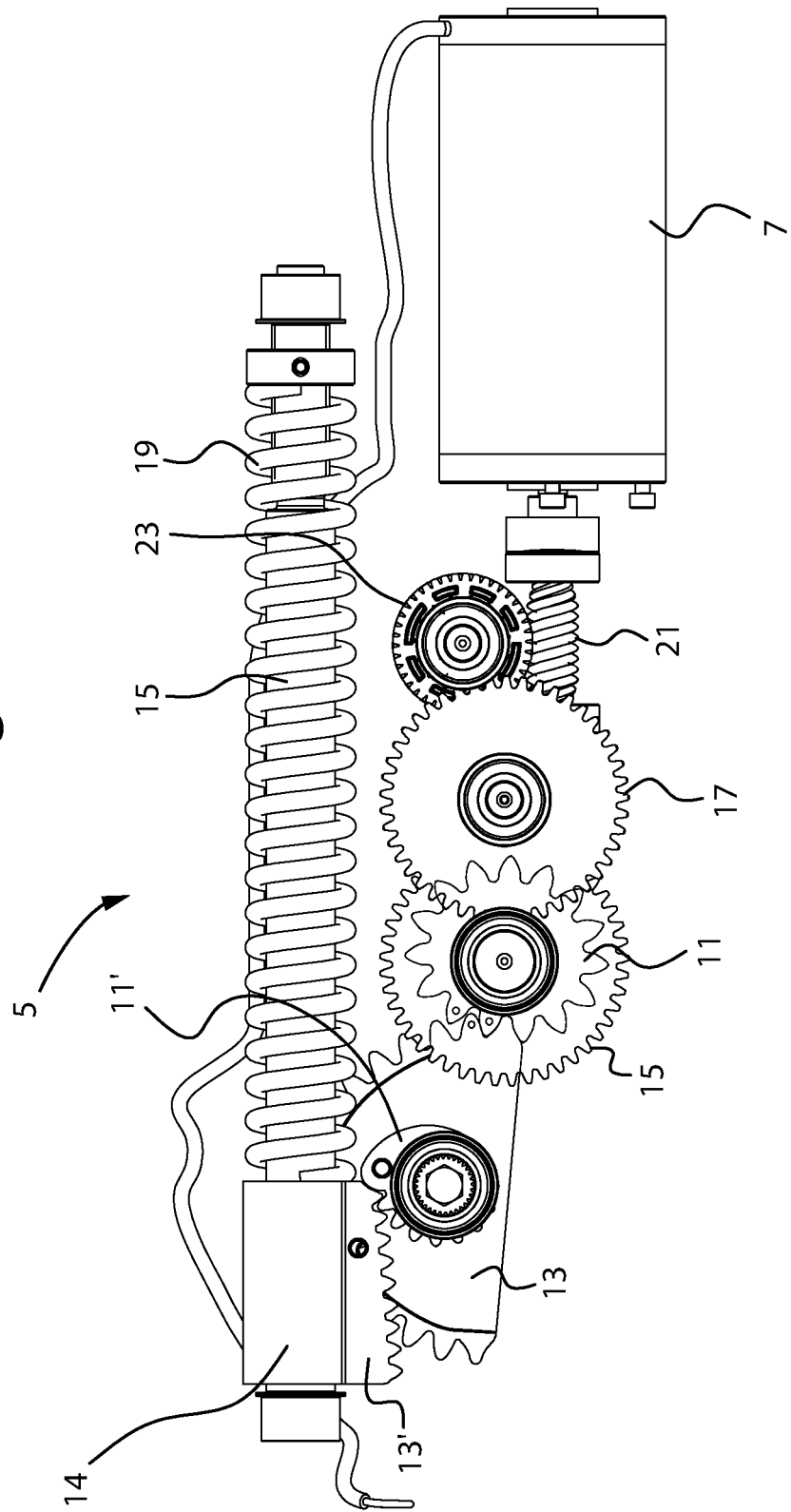
FIG. 1 shows a side view of a motorized drive according to a first particular embodiment of the invention.
Figure 4:
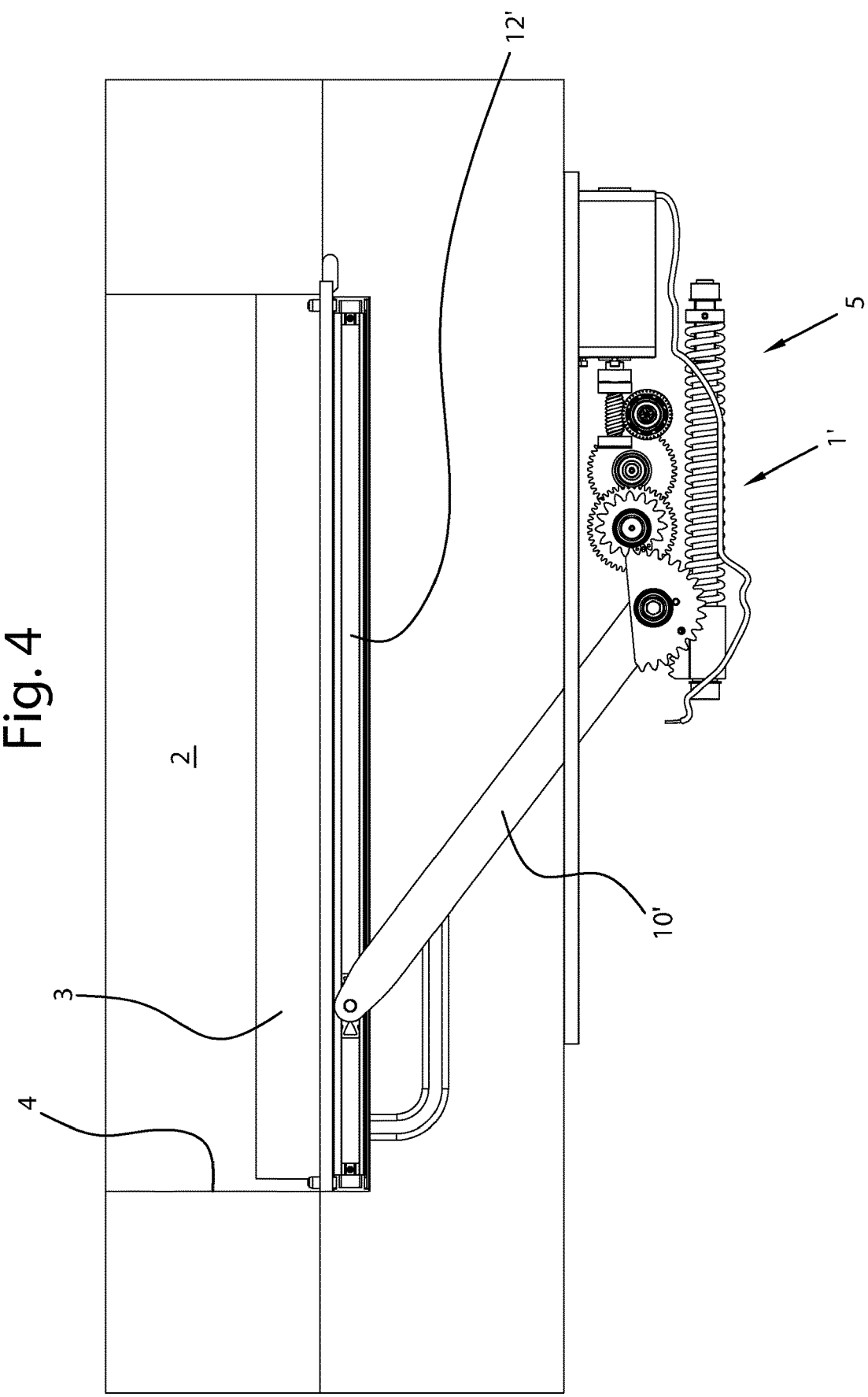
FIG. 4 shows a first top view of a door connected by a sliding arm to the motorized drive of FIG. 1 according to a second particular embodiment of the invention, in which the door is closed.
Figure 5:
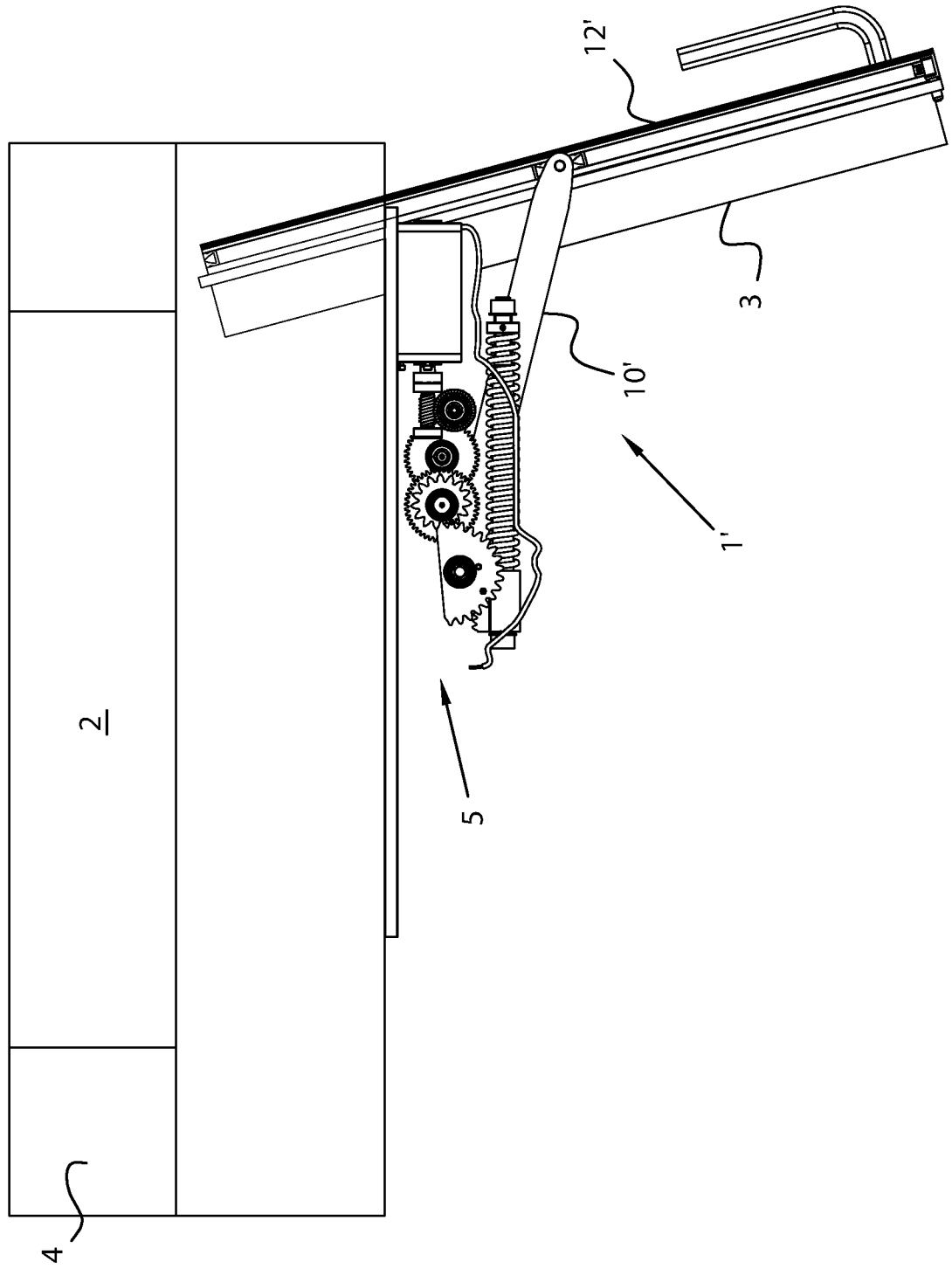
Figure 6:
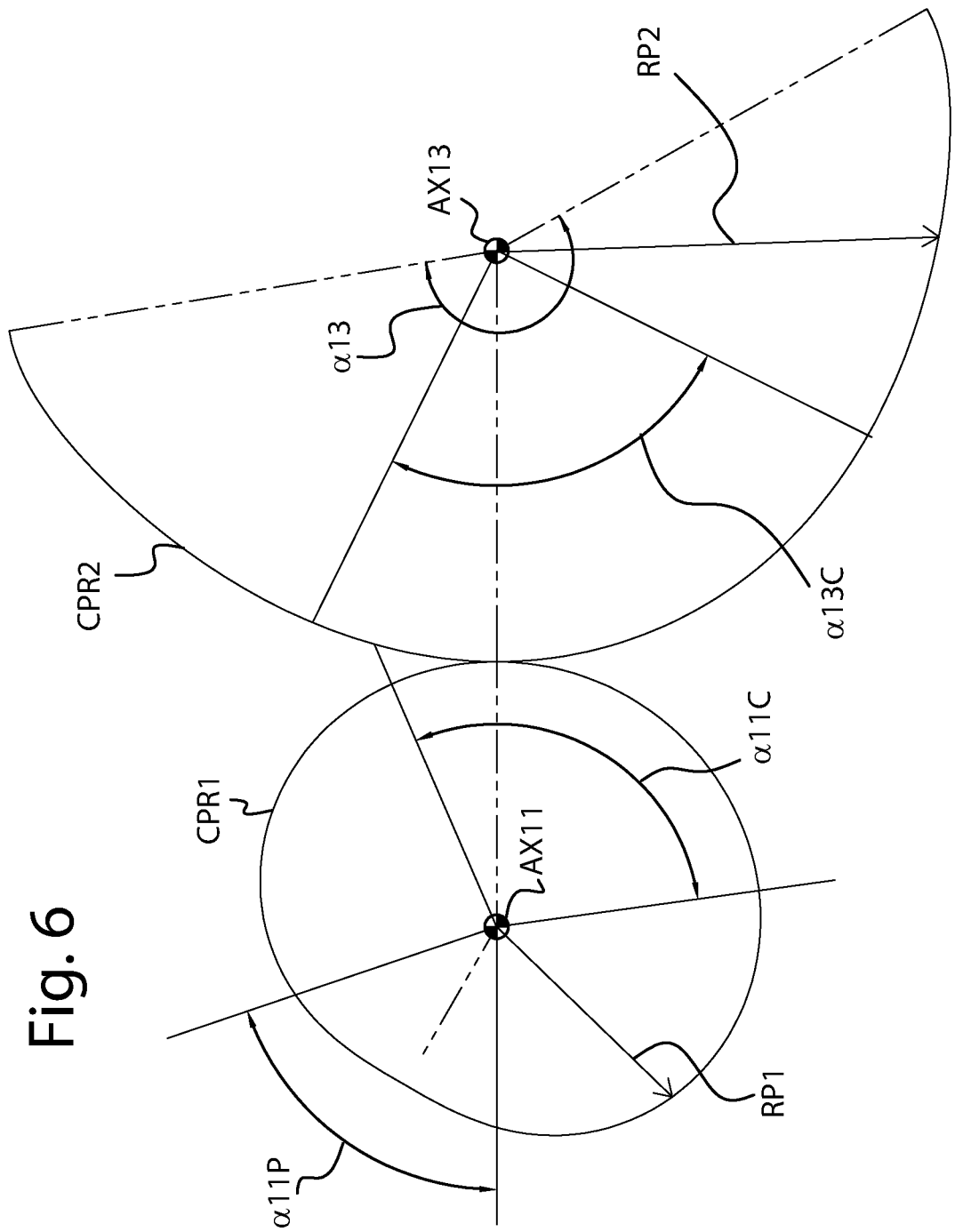
Figure 7:
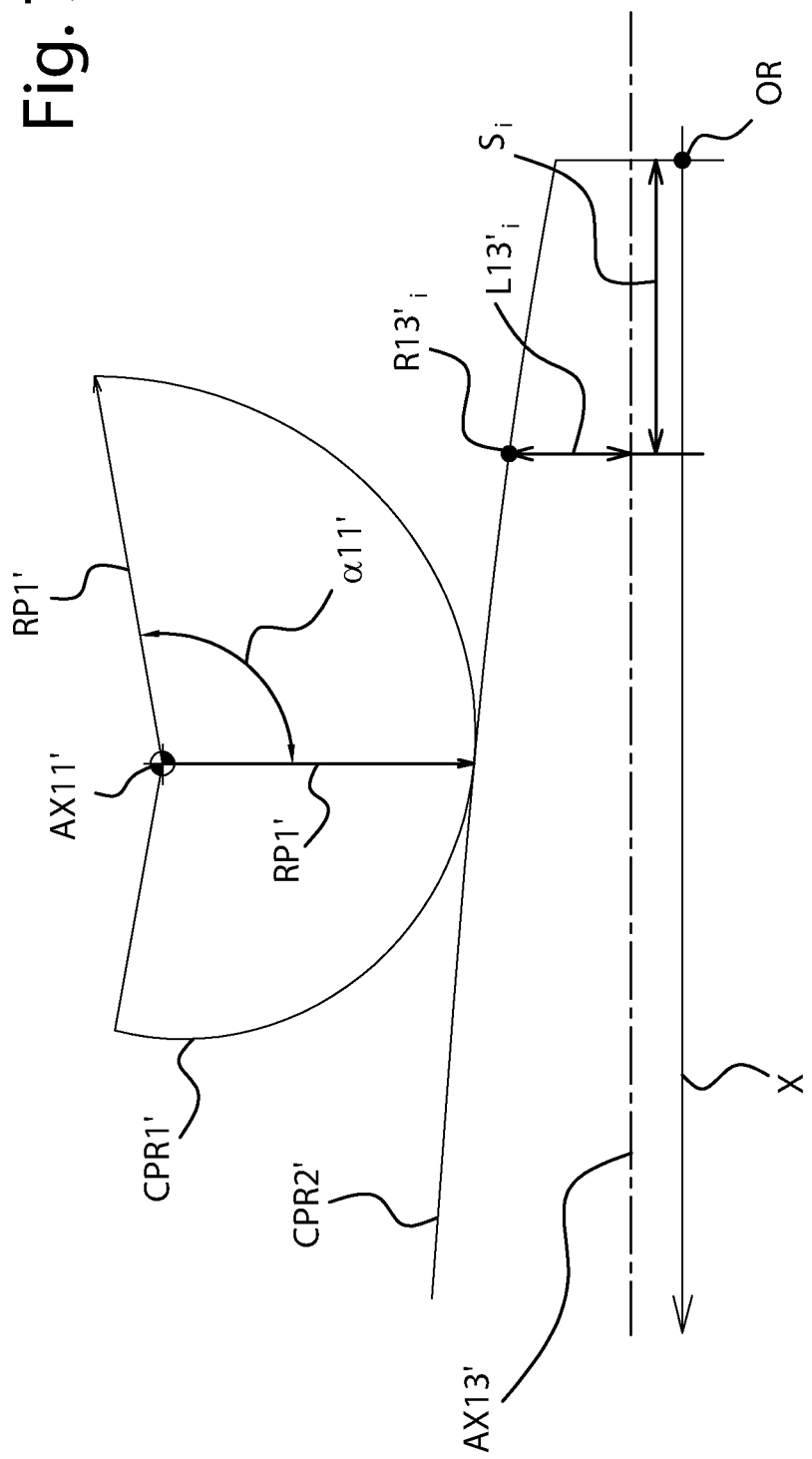
Figure 8:
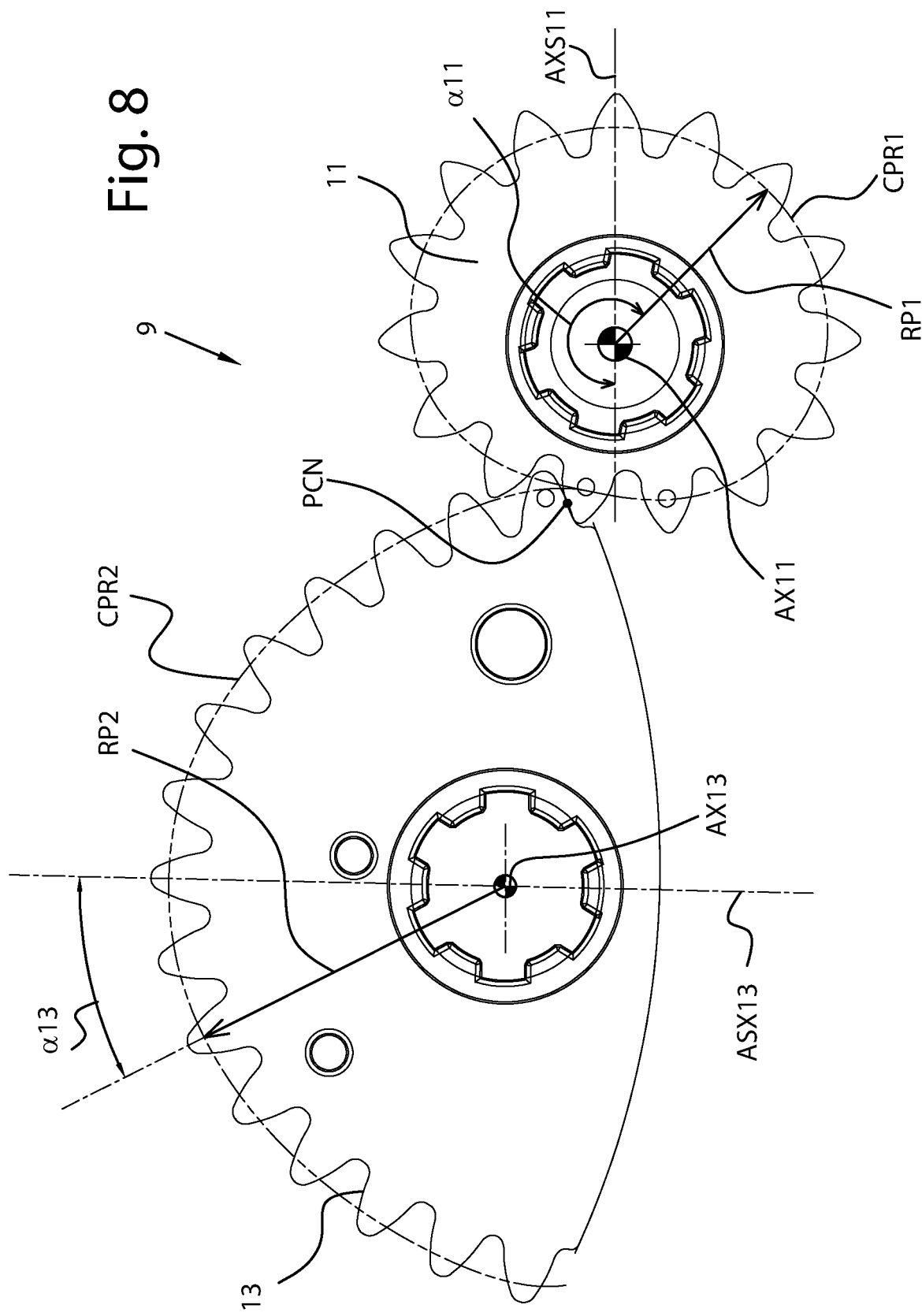
Figure 9:
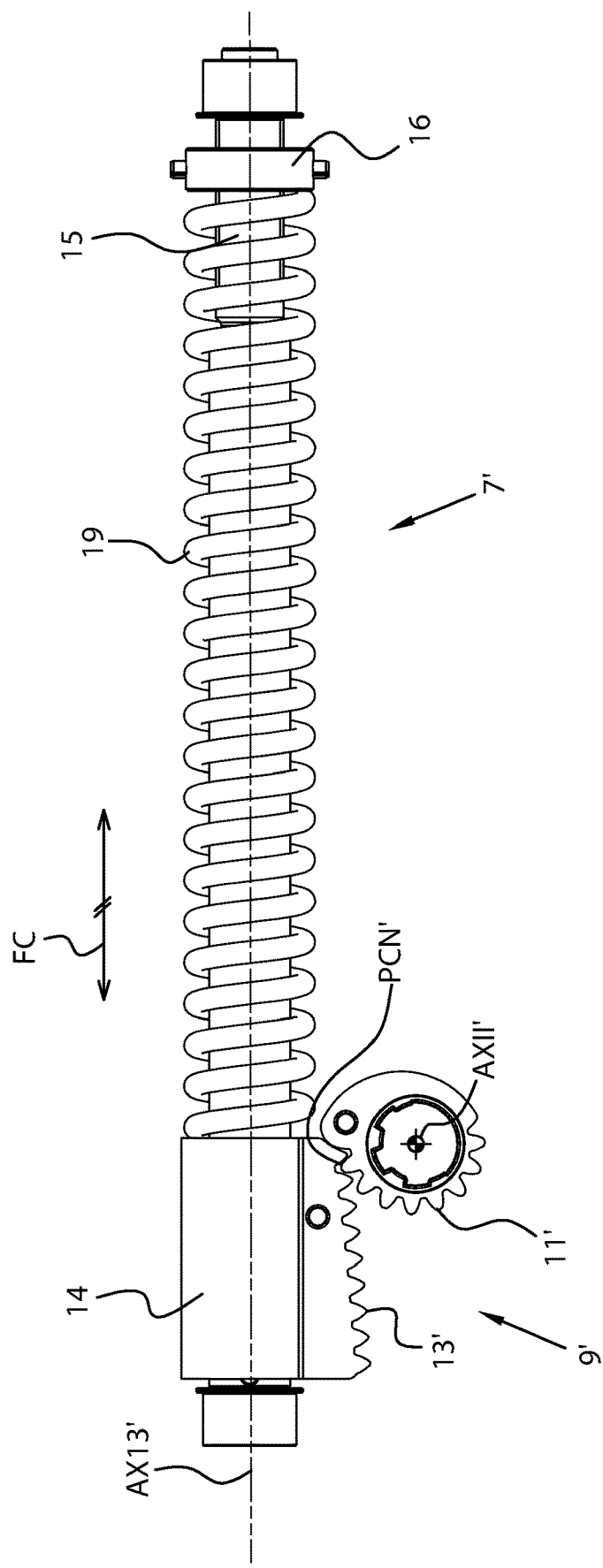
Figure 10:
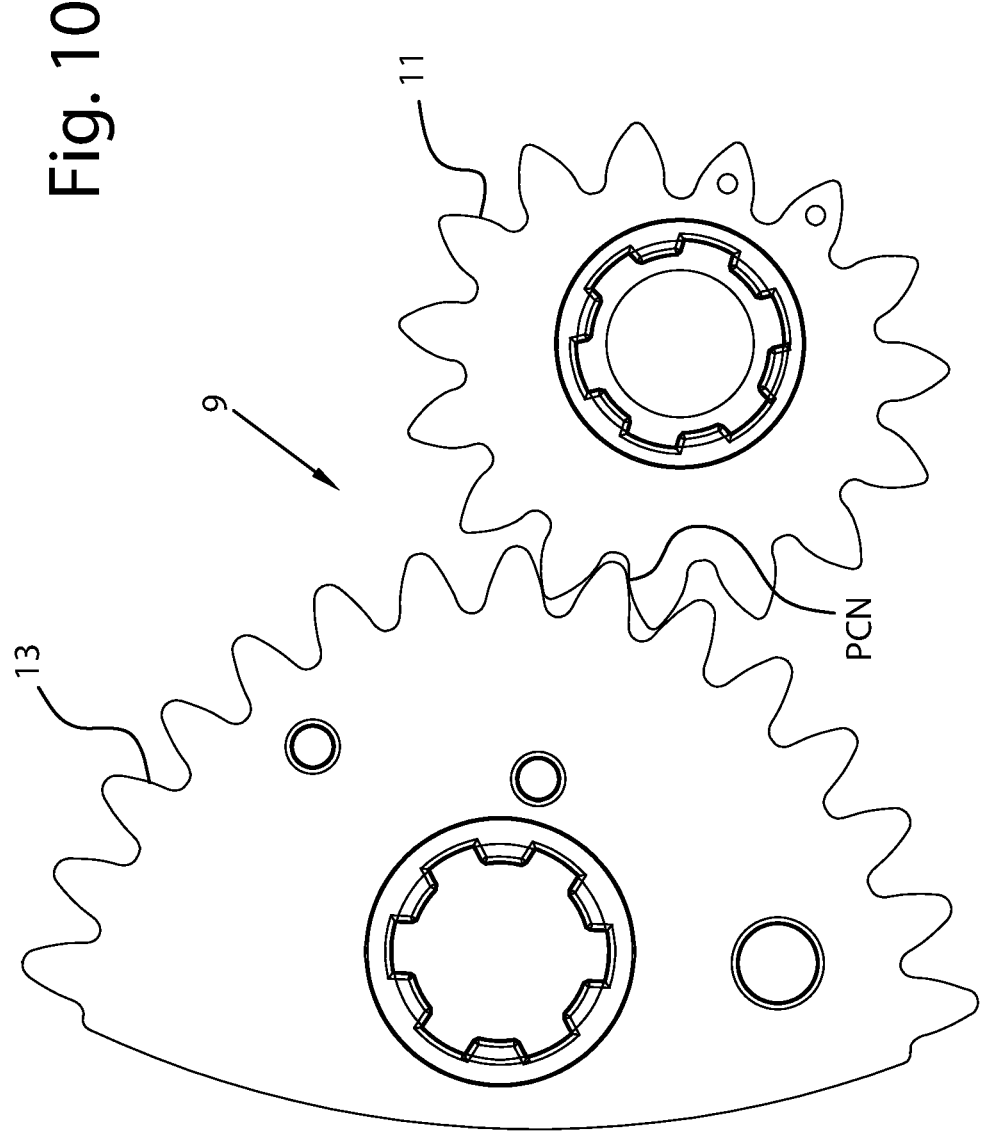
Figure 11:
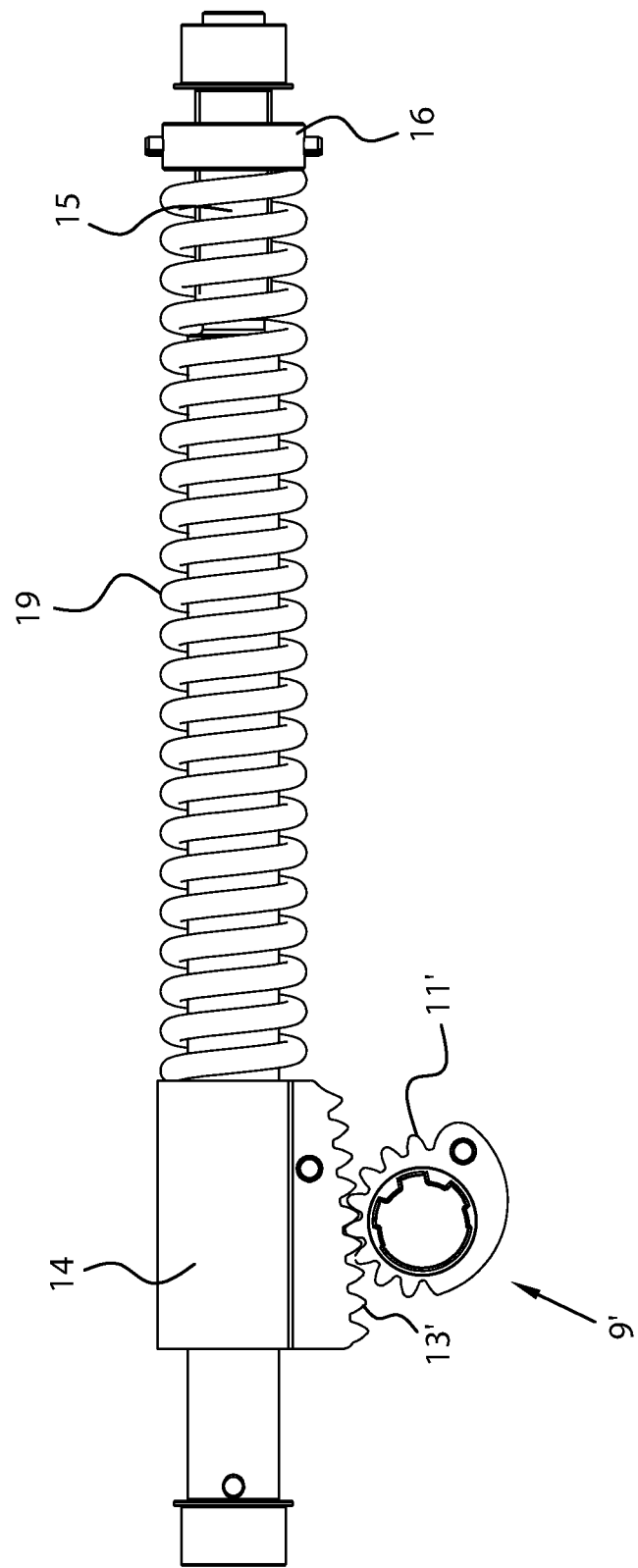
Figure 12:
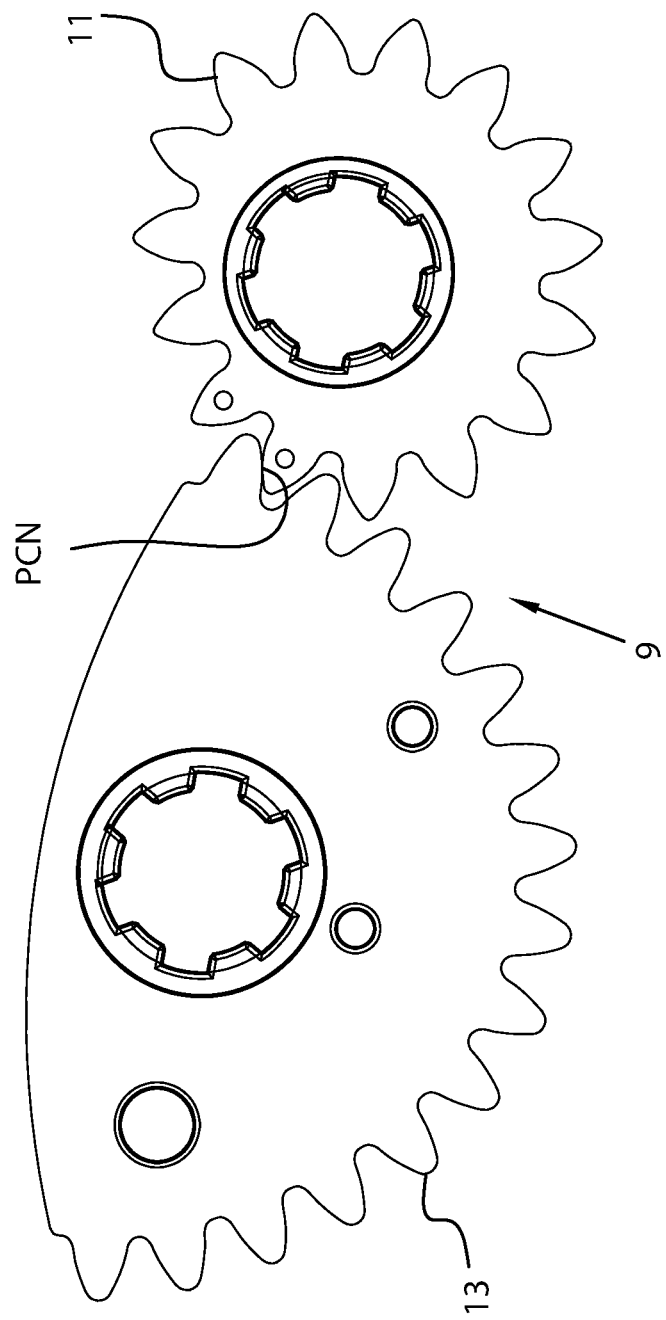
Figure 13:
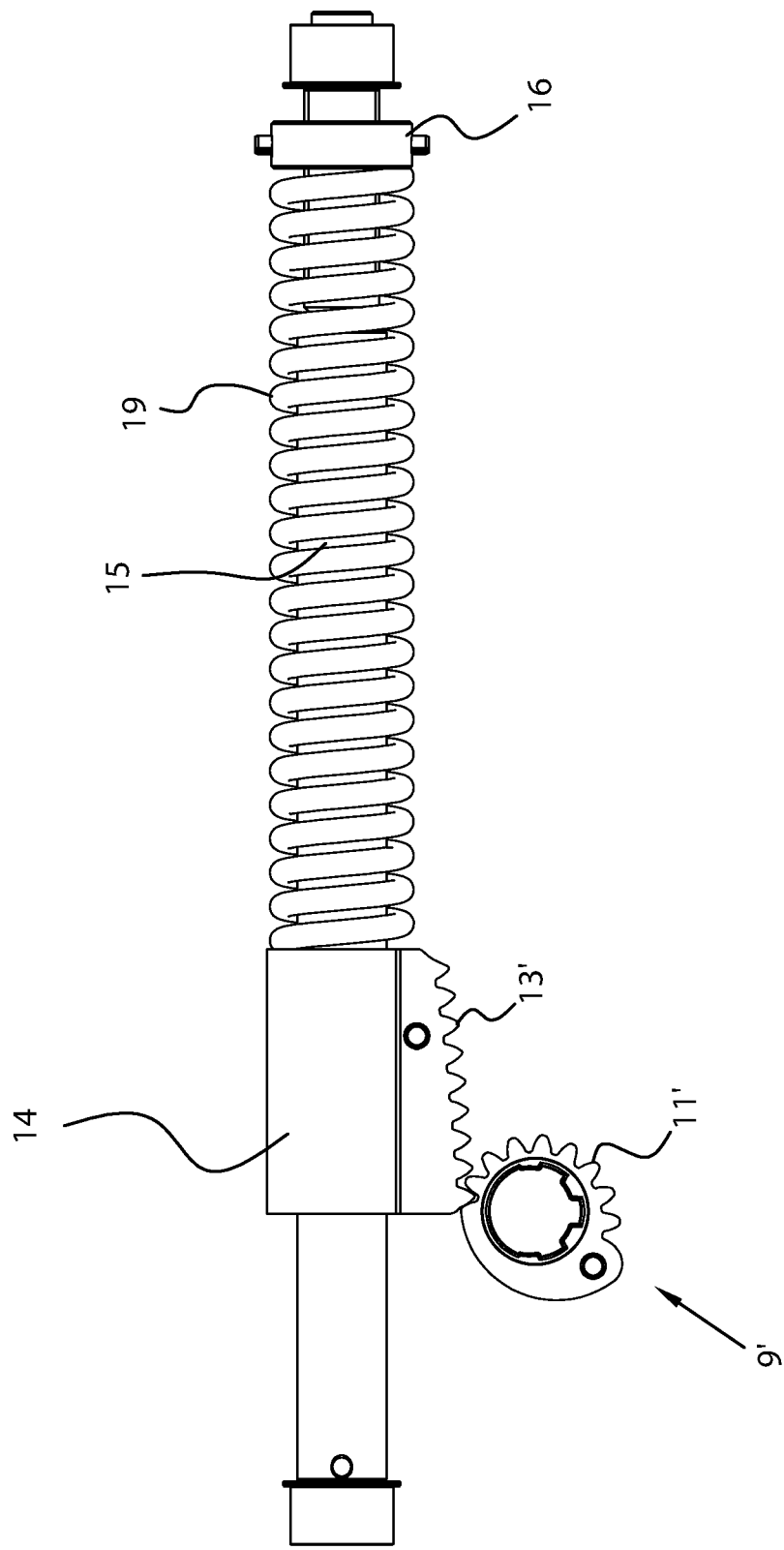
Figure 14:
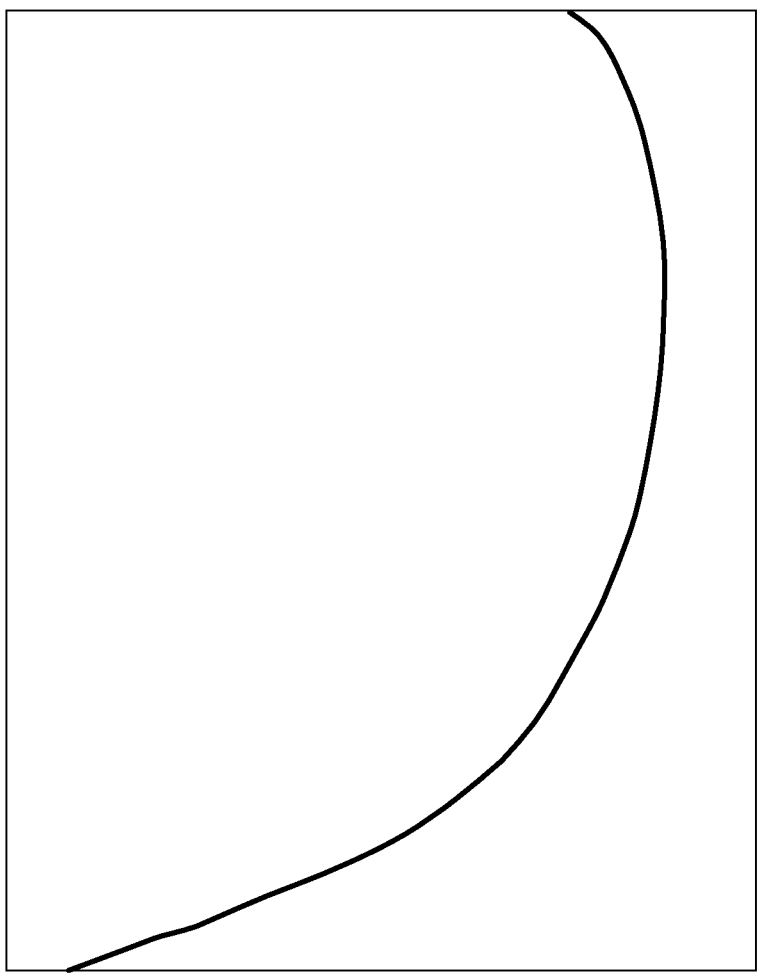
Figure 15:
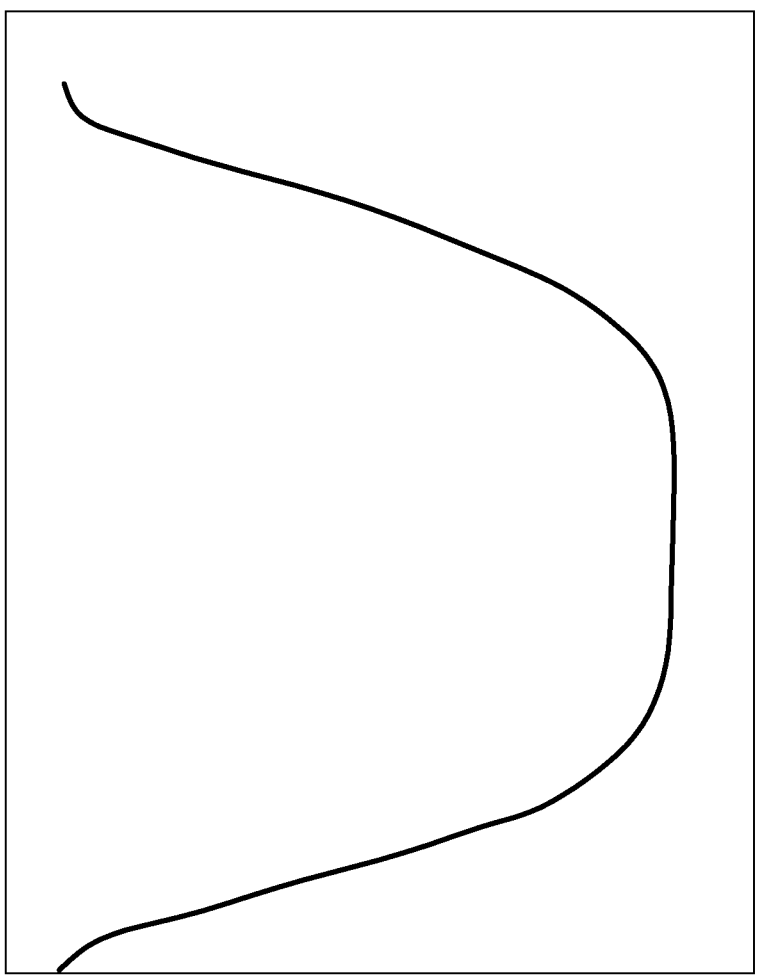
Figure 16:
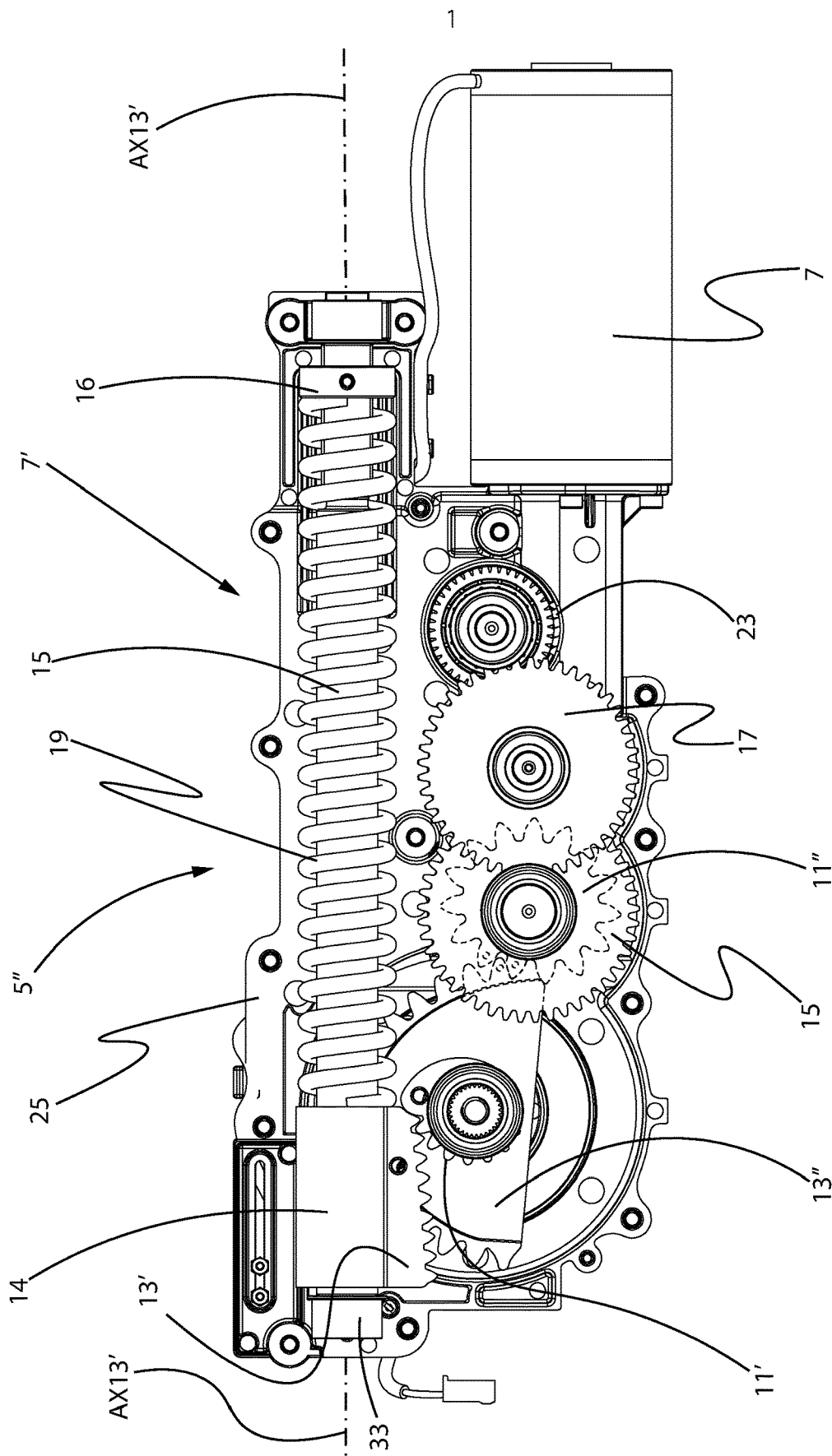
Figure 16A:
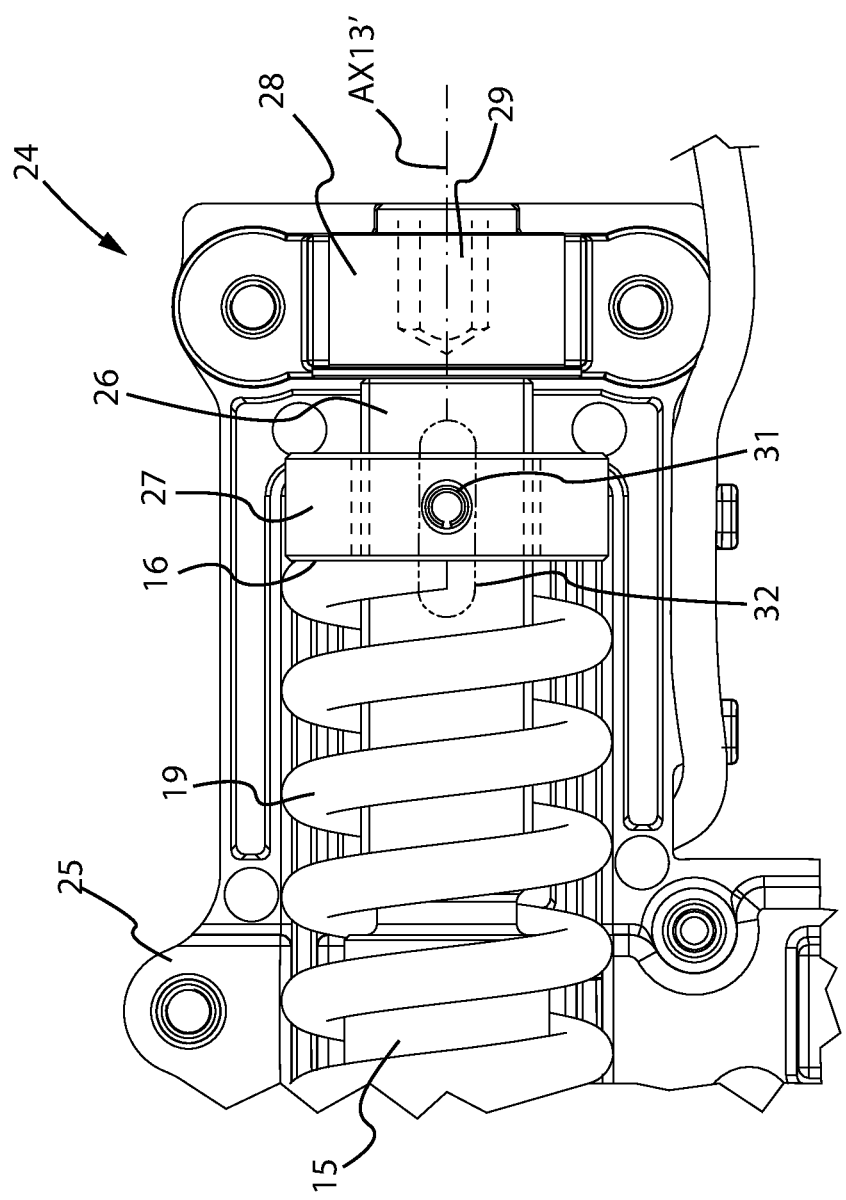
Figure 17:
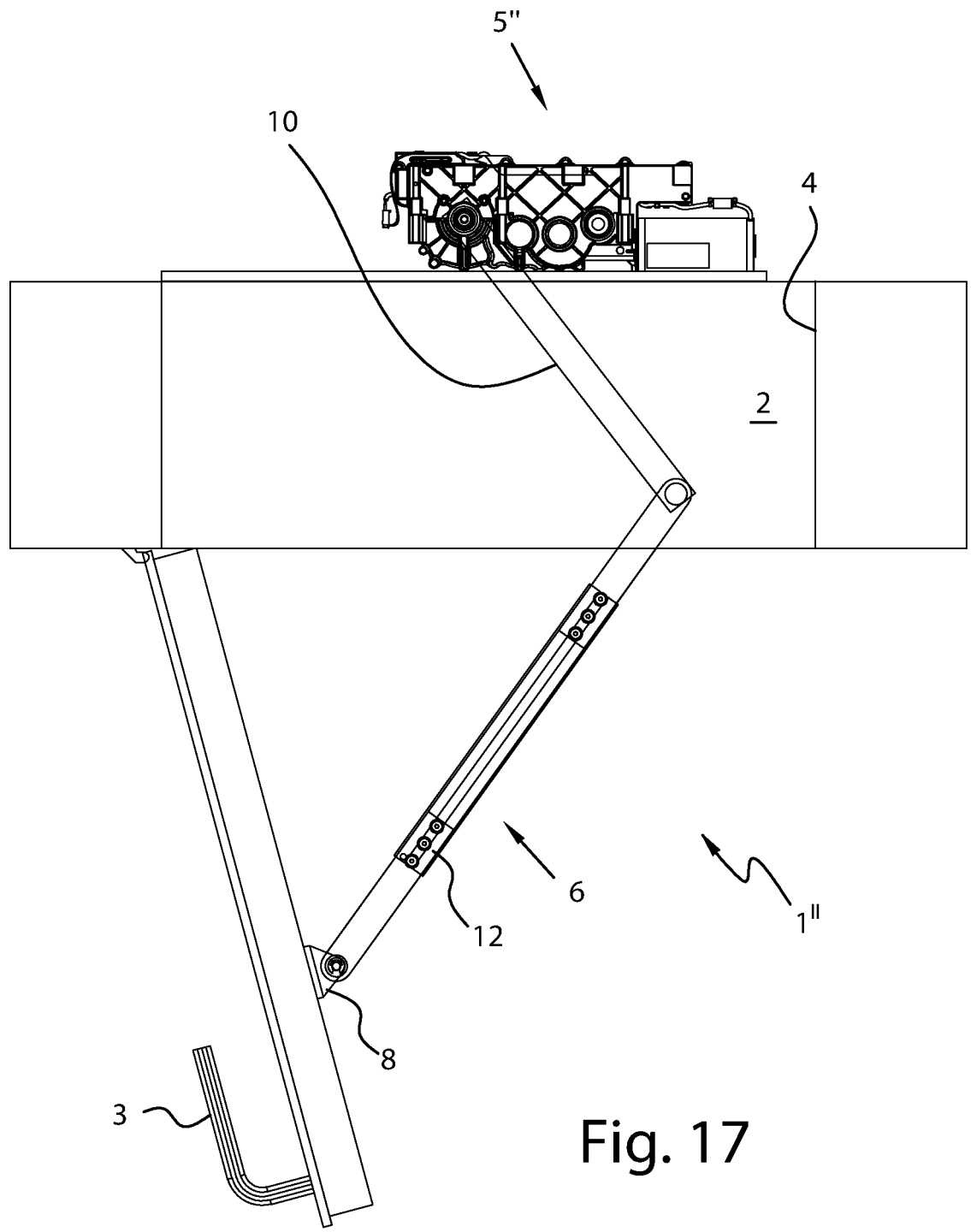
Figure 18:
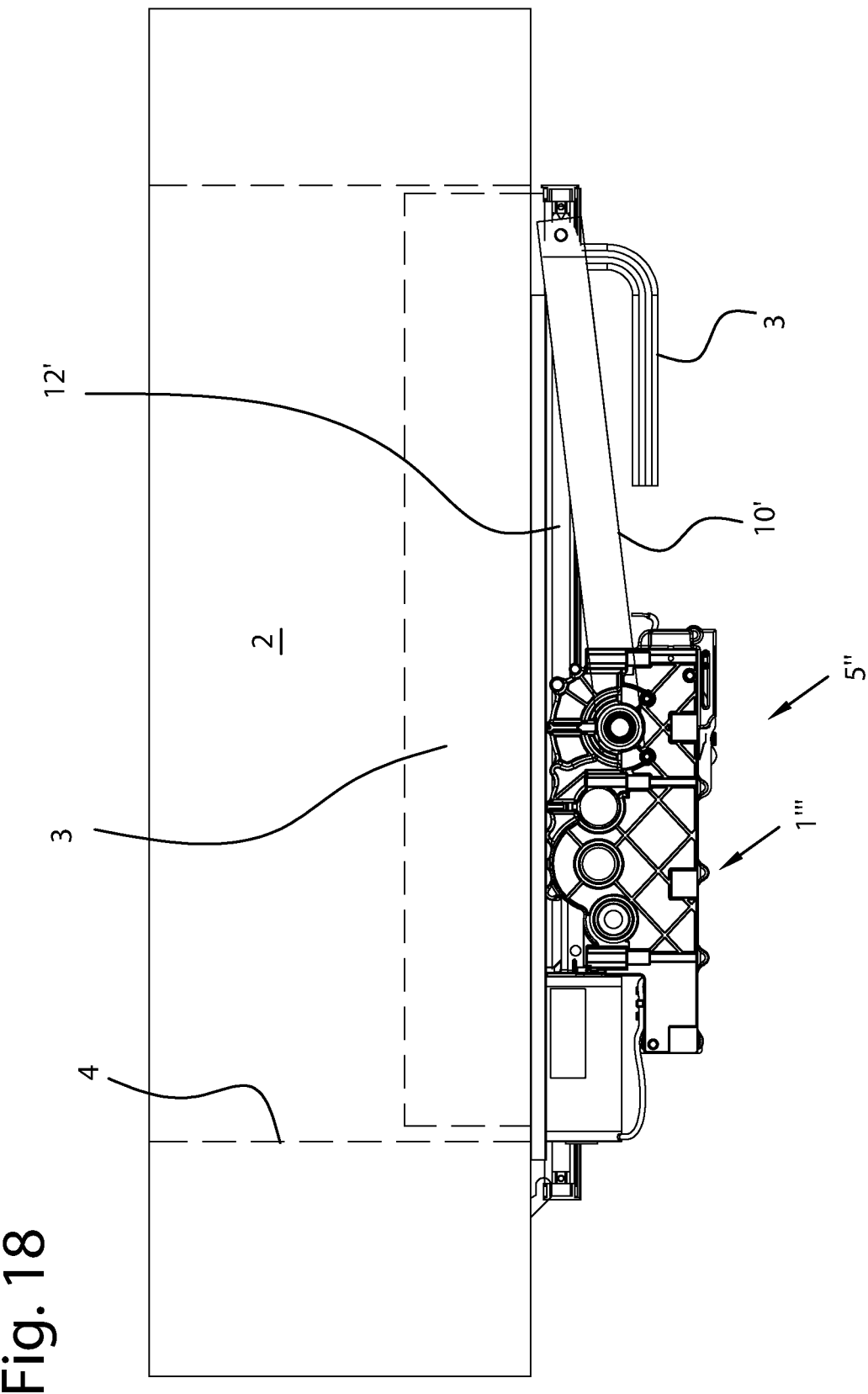
Figure 19:
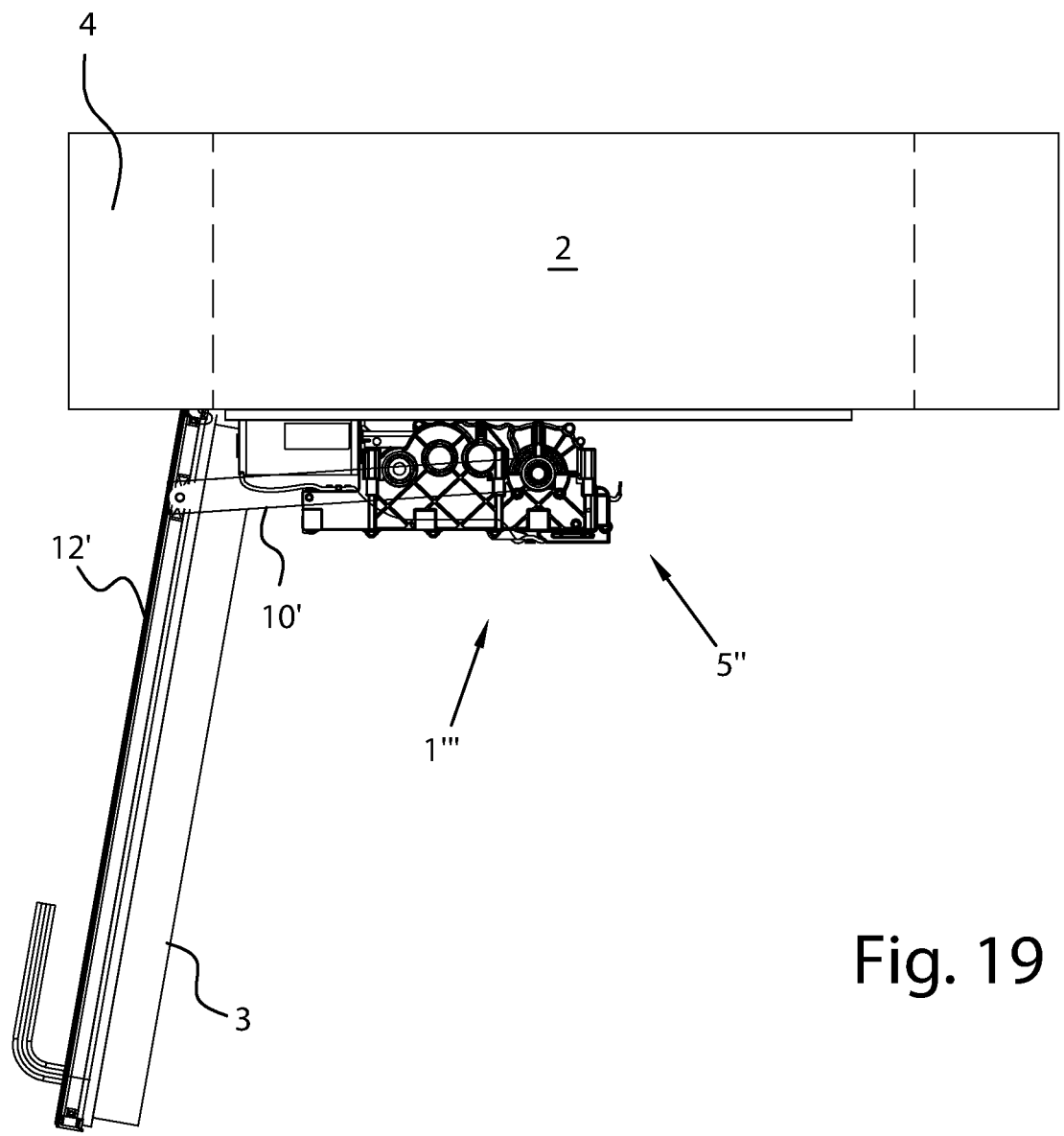
Figure 20:
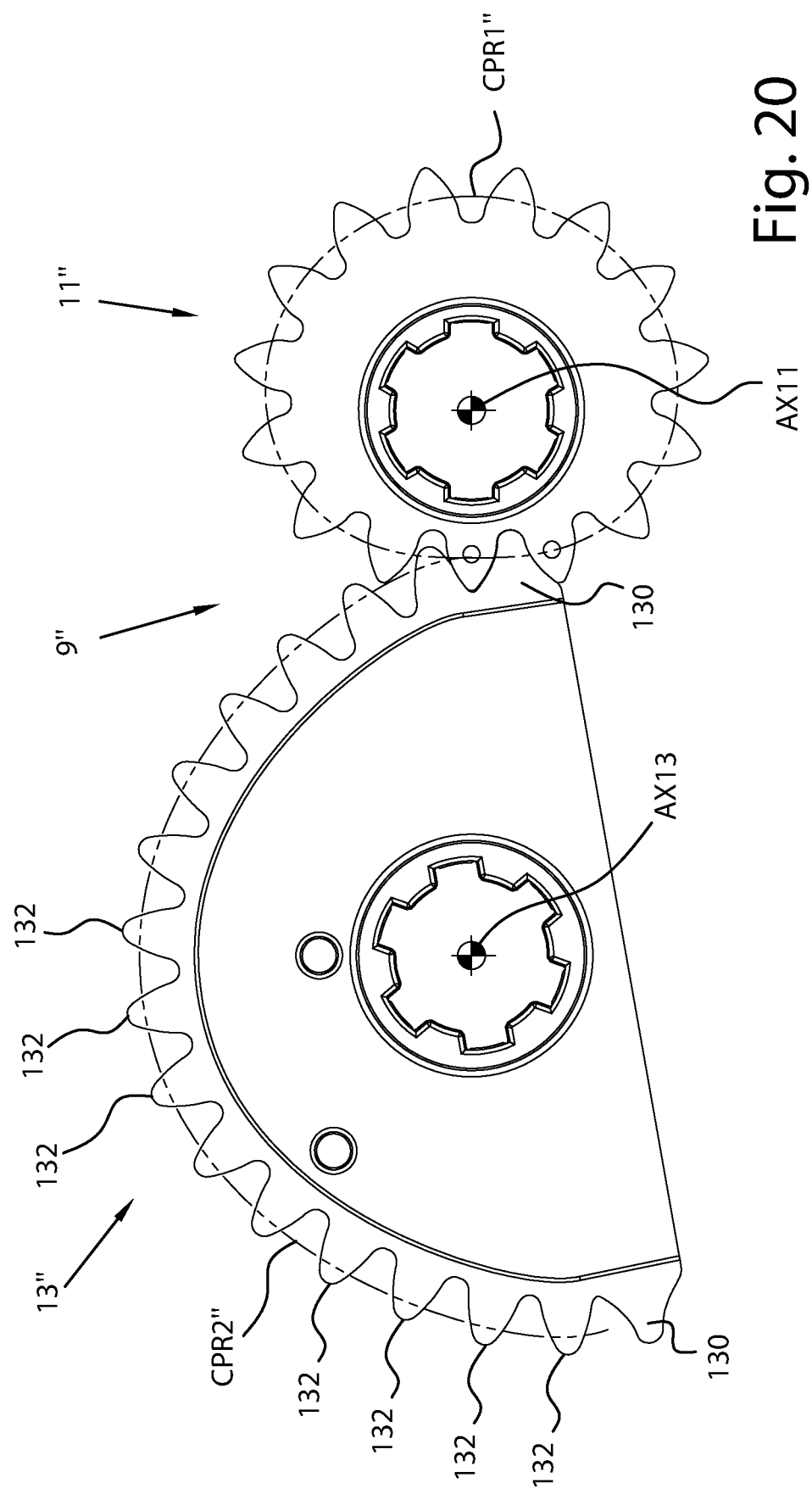
Figure 20C:
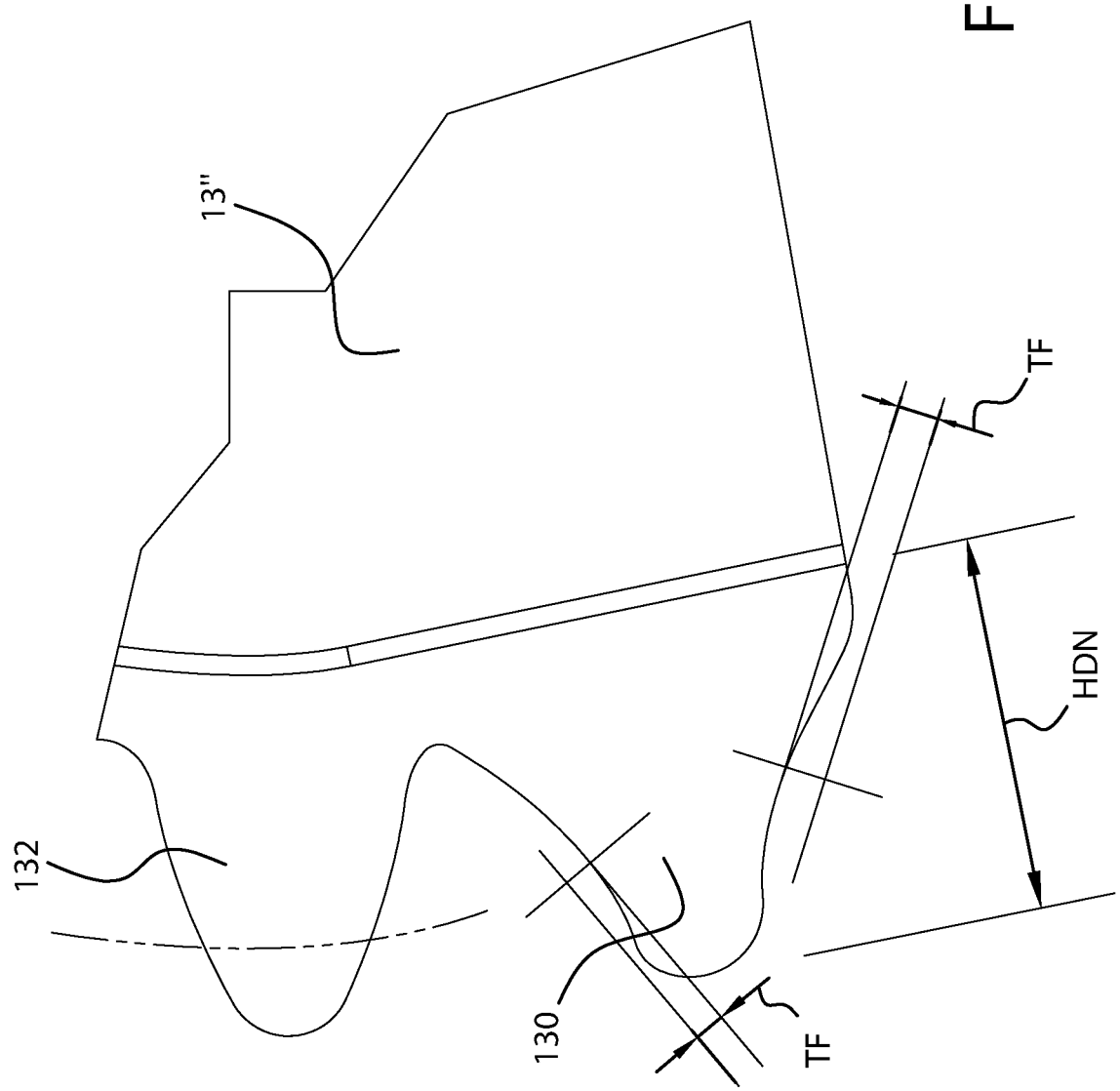
Figure 22:
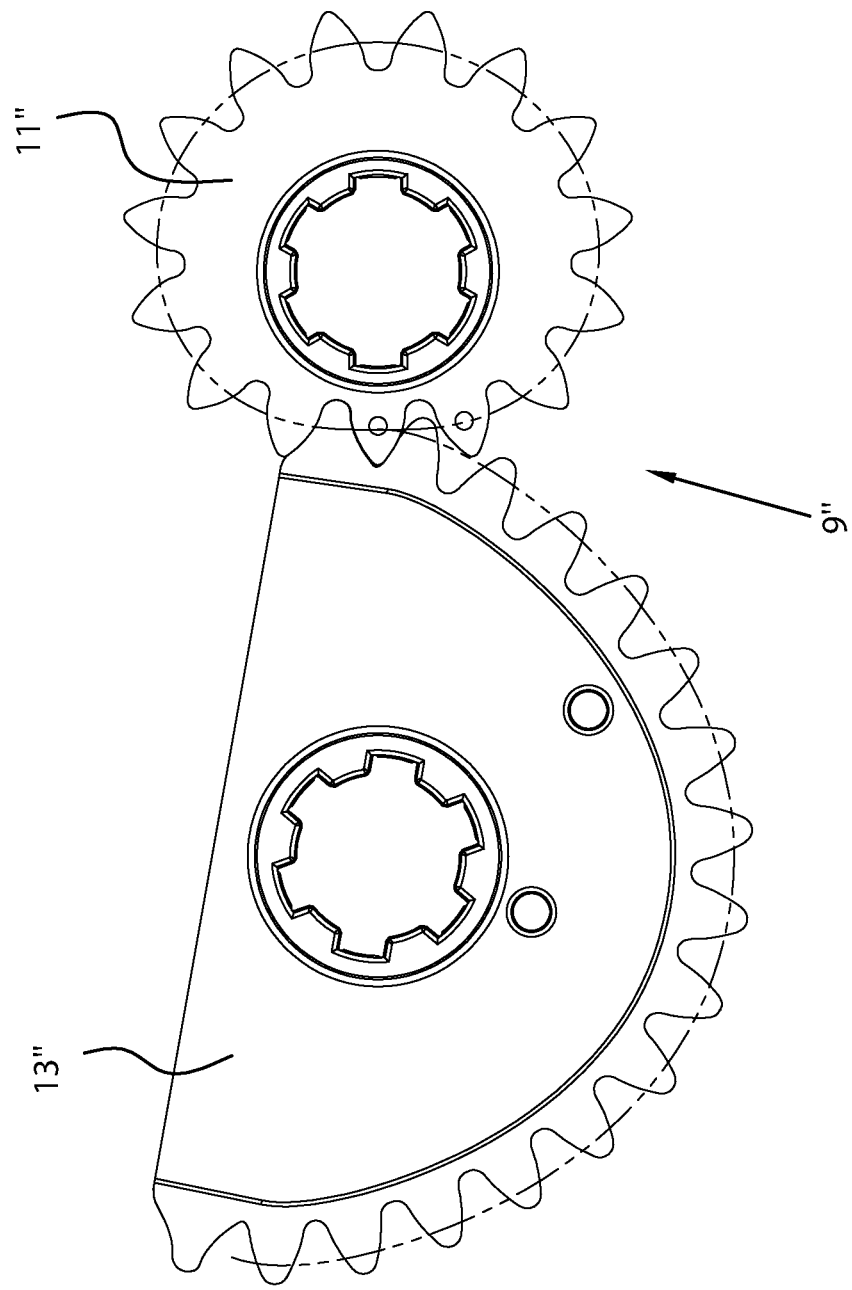

FIG. 5 a second top view of the door of FIG. 4, in which the door is open;

FIG. 6 shows the pitch profiles of the main drive of the motorized drive of FIG. 1;

FIG. 7 shows the pitch profiles of the auxiliary drive of the motorized drive of FIG. 1;

FIG. 8 shows the toothed profiles of the gear with a variable transmission ratio of the main drive of the motorized drive of FIG. 1, in the position in which the door is completely closed, observing the toothed profiles according to a direction parallel to their rotation axes;

FIG. 9 shows the toothed profiles of the gear with a variable transmission ratio of the auxiliary drive of the motorized drive of FIG. 1, in the position in which the door is completely closed and observing the toothed profiles according to a direction parallel to the rotation axis of the first tooth profile;

FIG. 10 shows the toothed profiles of FIG. 8, in a position in which the door is partially open;

FIG. 11 shows the toothed profiles of FIG. 9, in a position in which the door is partially open;

FIG. 12 shows the toothed profiles of FIG. 8, in a position in which the door is completely open;

FIG. 13 shows the toothed profiles of FIG. 9, in a position in which the door is completely open;

FIG. 14 shows a graph indicative of the reduction ratio of a kinematic mechanism with articulated arm of a known type, for operating wings of doors and main doors with an electric motor;

FIG. 15 shows a graph indicative of the reduction ratio of the reduction unit of FIG. 6, 8, 10, 12 or of FIGS. 19-22;

FIG. 16 shows a side view of a motorized drive according to a third particular embodiment of the invention;

FIG. 16A shows an enlarged detail of FIG. 16;

FIG. 17 shows a top view of an open door and connected through an articulated arm to the motorized drive of FIG. 16;

FIG. 18 shows a first top view of a door connected through a sliding arm to the motorized drive of FIG. 17 according to a fourth particular embodiment of the invention, in which the door is closed;

FIG. 19 shows a second top view of the door of FIG. 18, in which the door is open;

FIG. 20 shows the toothed profiles of the gear with a variable transmission ratio of the main drive of the motorized drive of FIG. 16, in the position in which the door is completely closed or at the maximum of its closing, observing the toothed profiles according to a direction parallel to their rotation axes;

FIG. 20A shows a first enlarged view of FIG. 20, with a detail of the first stop tooth of the second toothed profile;

FIG. 20B shows a second enlarged view of FIG. 20, with a detail of the second stop tooth of the second toothed profile;

FIG. 20C shows an enlarged view of FIG. 20B, with a detail of the second stop tooth of the second toothed profile;

FIG. 21 shows the toothed profiles of FIG. 20, in a position in which the door is partially open;

FIG. 22 shows the toothed profiles of FIG. 20, in a position in which the door is completely open or at its maximum opening.

Figure 23:
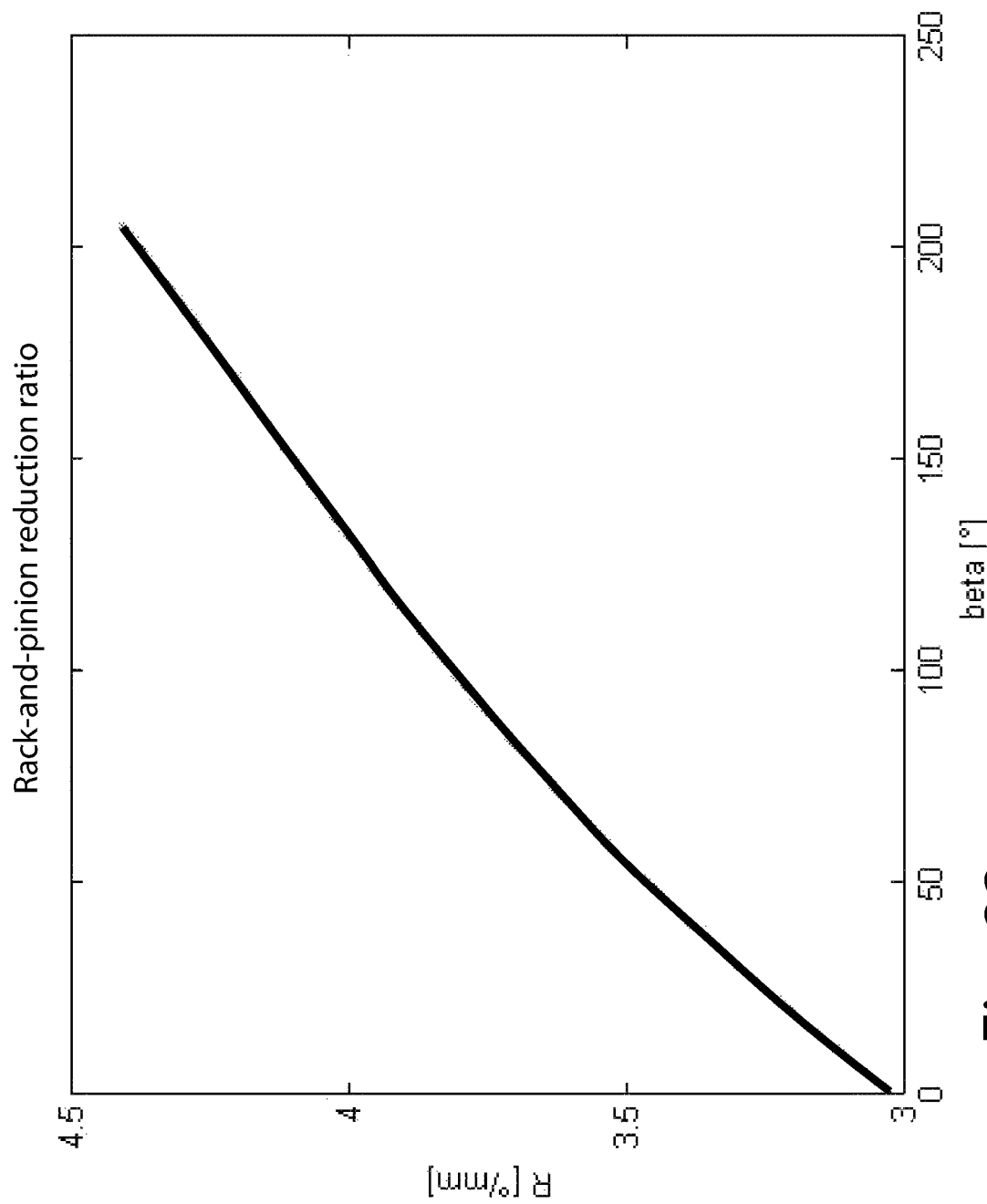

FIG. 23 shows a graph indicative of the reduction ratio of the reduction unit of FIG. 7, 9, 11, 13 or 19-22.

DETAILED DESCRIPTION

FIGS. 1-3, 6-15 relate to a barrier and to the relative drive according to a first particular embodiment, indicated with the overall reference 1.

As shown in FIG. 2-5, 17-19 said barrier 1, 1', 1", 1$^{III}$ can be for example a door, such as a door inside a building or that separates the inside from the outside but, in other embodiments not shown, it can be for example a main door, a gate, porthole, a swing shutter for example of a garage, a sliding wall or partition or other sliding wing.

In the present description, a door, gate or main door refer to barriers comprising one or two wings which can be reversibly opened and closed by rotating each one around a relative rotation axis substantially vertical or in any case inclined less than 45° with respect to the vertical.

In the present description, swing shutter means a barrier comprising one or two wings which can be reversibly opened and closed by rotating each one around a relative rotation axis substantially horizontal or in any case inclined less than 45° with respect to a horizontal plane.

A porthole can be opened or closed by rotating around a horizontal, vertical axis or having any angle with respect to a horizontal plane.

Each barrier 1, 1', 1", 1$^{III}$ comprises a wing 3 and a motorized drive 5, 5" configured to open and/or close the relative wing 3.

Like for example shown in FIGS. 2-5, 17-19 the wing 3 can reversibly close a space 2 delimited by a frame 4, which can for example be fixed to the wall of a building.

The motorized drive 5, 5" can for example be fixed to the frame 4 or directly to the wall of said building.

In other embodiments not shown the motorized drive 5, 5" can for example be fixed to the wing 3.

According to an aspect of the invention, the motorized drive 5, 5" comprises:

a motor 7;

a first reduction unit 9, 9" through which the motor 7 can operate the wing 3 by opening and closing it reversibly.

Preferably, the motorized drive 5, 5" also comprises a second reduction unit 9' through which the auxiliary motor 7' can operate the closure of the wing 3.

Preferably, the auxiliary motor 7' comprises a helical spring 19 and is driven by it.

"Motor" in the present description does not refer only to an electric or internal combustion motor but also other devices capable of providing mechanical power, such as for example the elastic energy motor 7' shown in FIGS. 9, 11, 13.

Like in the embodiment of FIG. 1, 16 the motor 7 can be electric.

The motor 7 preferably acts as a main motor.

The elastic energy auxiliary motor 7' is preferably configured to absorb mechanical energy during the opening of the wing 3 and release it during the closing thereof.

The auxiliary motor 7' can be connected to the wing 3 through the second reduction unit 9'.

The reduction unit 9; 9" comprises a first toothed profile 11; 11" and a second toothed profile 13; 13" which engage together between them realizing a gear with a variable transmission ratio depending on the angular and/or linear position of at least one of the two toothed profiles 11, 13; 11", 13".

At least one of the first 11; 11'; 11" and the second toothed profile 13; 13'; 13" forms at least one toothed section having a pitch profile CPR1, CPR2; CPR1", CPR2" substantially different from a full circumference, from a single arched circle and not even straight.

Like for example in the embodiments of the accompanying figures, the first 11, 11', 11" and the second toothed profile 13, 13', 13" can be toothings of cylindrical gears with straight teeth, but in other embodiments not shown they can also be toothings with helical and/or conical teeth.

The first 11; 11" and the second toothed profile 13; 13" are mounted on suitable shafts, not shown, and configured to rotate around respective axes AX11, AX13.

The two axes AX11, AX13 are preferably parallel to each other and arranged at a fixed distance from each other.

The distance between the respective rotation axes AX11, AX13 and a point of the pitch curve CPR11, CPR13 respectively of the toothing 11, 13; 11", 13" in question in the present description is considered as the radius RP1, RP2 of the toothing associated with that point and the angular position α11, α13 of that point with respect to the respective axis AX11 or AX13.

Preferably the first toothed profile 11; 11" advantageously has a pitch profile as a whole closed on itself so as to allow the profile 11; 11" to describe full rotations rotating on itself when engaged with another toothed profile (FIGS. 1, 6, 7; 20-22).

Like in the embodiments of FIGS. 1, 6, 8; 20-22 the first toothed profile 11; 11" advantageously has a pitch profile whose shape is approximated by points from the following table 11A or 11B or 11E; the points are defined by the polar coordinates α11, RP1, where the angle α11 can be for example referred to the possible axis of symmetry AXS11 of the toothed profile 11, 11"; like for example in the embodiments of FIGS. 1, 6, 8; 20-22 the axis of symmetry AXS11 passes through the rotation axis AX11 and through the point where the radius RP1 is minimum

TABLE 11A

| Point | Angle α11 [degrees] | Radius RP1 Minimum values 2 [mm] | Radius RP1 Maximum values 2 [mm] | Radius RP1 Minimum values 1 | Radius RP1 Maximum values 1 [mm] |
|---|---|---|---|---|---|
| 1 | 0 | 13.94592 | 20.91888 | 12.20268 | 22.66212 |
| 3 | 20 | 14.62896 | 21.94344 | 12.80034 | 23.77206 |
| 5 | 40 | 16.08328 | 24.12492 | 14.07287 | 26.13533 |
| 7 | 60 | 17.62376 | 26.43564 | 15.42079 | 28.63861 |
| 9 | 80 | 18.87952 | 28.31928 | 16.51958 | 30.67922 |
| 11 | 100 | 19.71208 | 29.56812 | 17.24807 | 32.03213 |
| 13 | 120 | 20.12744 | 30.19116 | 17.61151 | 32.70709 |
| 15 | 140 | 20.73872 | 31.10808 | 18.14638 | 33.70042 |
| 17 | 160 | 20.23528 | 30.35292 | 17.70587 | 32.88233 |
| 19 | 180 | 20.23528 | 30.35292 | 17.70587 | 32.88233 |
| 21 | 200 | 20.23528 | 30.35292 | 17.70587 | 32.88233 |
| 23 | 220 | 20.73872 | 31.10808 | 18.14638 | 33.70042 |
| 25 | 240 | 20.12744 | 30.19116 | 17.61151 | 32.70709 |
| 27 | 260 | 19.71208 | 29.56812 | 17.24807 | 32.03213 |
| 29 | 280 | 18.87952 | 28.31928 | 16.51958 | 30.67922 |
| 31 | 300 | 17.62376 | 26.43564 | 15.42079 | 28.63861 |
| 33 | 320 | 16.08328 | 24.12492 | 14.07287 | 26.13533 |
| 35 | 340 | 14.62896 | 21.94344 | 12.80034 | 23.77206 |
| 37 | 360 | 13.94592 | 20.91888 | 12.20268 | 22.66212 |

TABLE 11B

| Point | Angle α11 [degrees] | Radius RP1 Values 5 [mm] | Radius RP1 Minimum values 4 | Radius RP1 Maximum values 4 [mm] | Radius RP1 Minimum values 3 | Radius RP1 Maximum values 3 [mm] |
|---|---|---|---|---|---|---|
| 1 | 0 | 17.4324 | 16.56078 | 18.30402 | 15.68916 | 19.17564 |
| 3 | 20 | 18.2862 | 17.37189 | 19.20051 | 16.45758 | 20.11482 |
| 5 | 40 | 20.1041 | 19.098895 | 21.109305 | 18.09369 | 22.11451 |
| 7 | 60 | 22.0297 | 20.928215 | 23.131185 | 19.82673 | 24.23267 |
| 9 | 80 | 23.5994 | 22.41943 | 24.77937 | 21.23946 | 25.95934 |
| 11 | 100 | 24.6401 | 23.408095 | 25.872105 | 22.17609 | 27.10411 |
| 13 | 120 | 25.1593 | 23.901335 | 26.417265 | 22.64337 | 27.67523 |
| 15 | 140 | 25.9234 | 24.62723 | 27.21957 | 23.33106 | 28.51574 |
| 17 | 160 | 25.2941 | 24.029395 | 26.558805 | 22.76469 | 27.82351 |
| 19 | 180 | 25.2941 | 24.029395 | 26.558805 | 22.76469 | 27.82351 |
| 21 | 200 | 25.2941 | 24.029395 | 26.558805 | 22.76469 | 27.82351 |
| 23 | 220 | 25.9234 | 24.62723 | 27.21957 | 23.33106 | 28.51574 |
| 25 | 240 | 25.1593 | 23.901335 | 26.417265 | 22.64337 | 27.67523 |
| 27 | 260 | 24.6401 | 23.408095 | 25.872105 | 22.17609 | 27.10411 |
| 29 | 280 | 23.5994 | 22.41943 | 24.77937 | 21.23946 | 25.95934 |
| 31 | 300 | 22.0297 | 20.928215 | 23.131185 | 19.82673 | 24.23267 |
| 33 | 320 | 20.1041 | 19.098895 | 21.109305 | 18.09369 | 22.11451 |
| 35 | 340 | 18.2862 | 17.37189 | 19.20051 | 16.45758 | 20.11482 |
| 37 | 360 | 17.4324 | 16.56078 | 18.30402 | 15.68916 | 19.17564 |

TABLE 11E

| Point | Angle α11 [degrees] | Radius RP1 Values 6 [mm] | Radius RP1 Minimum values 6 |
|---|---|---|---|
| 1 | 0 | 17.00 | 17.87 |
| 2 | 10 | 17.23 | 18.11 |
| 3 | 20 | 17.83 | 18.74 |
| 4 | 30 | 18.66 | 19.62 |
| 5 | 40 | 19.60 | 20.61 |
| 6 | 50 | 20.56 | 21.62 |
| 7 | 60 | 21.48 | 22.58 |
| 8 | 70 | 22.30 | 23.45 |
| 9 | 80 | 23.01 | 24.19 |
| 10 | 90 | 23.58 | 24.79 |
| 11 | 100 | 24.02 | 25.26 |
| 12 | 110 | 24.34 | 25.58 |
| 13 | 120 | 24.53 | 25.79 |
| 14 | 130 | 24.63 | 25.89 |
| 15 | 140 | 25.28 | 26.57 |
| 16 | 150 | 24.66 | 25.93 |
| 17 | 160 | 24.66 | 25.93 |
| 18 | 170 | 24.66 | 25.93 |
| 19 | 180 | 24.66 | 25.93 |
| 20 | 190 | 24.66 | 25.93 |
| 21 | 200 | 24.66 | 25.93 |
| 22 | 210 | 24.66 | 25.93 |
| 23 | 220 | 25.28 | 26.57 |
| 24 | 230 | 24.63 | 25.89 |
| 25 | 240 | 24.53 | 25.79 |
| 26 | 250 | 24.34 | 25.58 |
| 27 | 260 | 24.02 | 25.26 |
| 28 | 270 | 23.58 | 24.79 |
| 29 | 280 | 23.01 | 24.19 |
| 30 | 290 | 22.30 | 23.45 |
| 31 | 300 | 21.48 | 22.58 |
| 32 | 310 | 20.56 | 21.62 |
| 33 | 320 | 19.60 | 20.61 |
| 34 | 330 | 18.66 | 19.62 |
| 35 | 340 | 17.83 | 18.74 |
| 36 | 350 | 17.23 | 18.11 |
| 37 | 360 | 17.00 | 17.87 |

The pitch profiles CPR1, CPR2; CPR1", CPR2" are indicated in FIG. 8; 20-22 with dash-dotted lines.

The value of the radius RP1 at each point is preferably comprised between the respective minimum 1 and maximum value 1, more preferably comprised between the respective minimum 2 and maximum value 2, more preferably comprised between the respective minimum 3 and maximum value 3, more preferably comprised between the respective minimum 4 and maximum value 4; more preferably comprised between the respective minimum 6 and maximum value 6 and even more preferably about equal to the respective value 5 indicated in table 11A or 11B.

The dimensions of the pitch profile CPR1 of the first toothed profile 11, 11" can clearly vary by increasing or decreasing in scale the values of table 11A or 11B or 11E, but for example retaining its shape.

Preferably the radius RP1 has a single point of absolute minimum (at point 1, 37 of the embodiments of table 11A) along the pitch profile CPR1, CPR1".

Preferably the pitch profile CPR1, CPR1" is symmetrical with respect to an ideal plane passing through said point of absolute minimum and through the rotation axis AX11.

Preferably a portion of the pitch profile CPR1 around the point of absolute minimum is substantially straight and symmetrical with respect to the plane of symmetry of the profile CPR1, CPR1" and this substantially straight portion subtends an angle α11P comprised between about 50-75° with reference to the rotation axis AX11.

Preferably the portion of the pitch profile CPR1 diametrically opposite to the point of absolute minimum substantially forms an arc of a circle, it is also symmetrical with respect to the plane of symmetry of the profile CPR1 and subtends an angle α11C comprised between about 50-90° with reference to the rotation axis AX11.

Preferably the radius RP1 reaches two absolute maximum values on the entire pitch profile CPR1 arranged outside both the section in which this profile is substantially straight, and the section in which it is substantially an arc of a circle.

Preferably the second toothed profile 13, 13" forms at least a toothed section having a pitch profile substantially different from a full circumference, from a single arc of a circle and not even straight.

Preferably the second toothed profile 13, 13', 13" forms at least a toothed section having a pitch profile as a whole substantially open, that is, not closed on itself (FIGS. 1, 6, 8, 20-22).

Like in the embodiments of FIGS. 1, 6, 8; 20-22 the second profile 13; 13" advantageously has a pitch profile CPR2; CPR2" whose shape is approximated by points from the following table 13A or 13B or 13E; the points are defined by the polar coordinates α13, RP2, where the angle α13 can be for example referred to the possible axis of symmetry AXS13 of the toothed profile 13, 13"; like for example in the embodiments of FIGS. 1, 6, 8; 20-22 the axis of symmetry AXS13 passes through the rotation axis AX13 and through the point where the radius RP2 is minimum.

TABLE 13A

| Point | Angle α13 [degrees] | Radius RP2 Minimum values 2 [mm] | Radius RP2 Maximum values 2 [mm] | Radius RP2 Minimum values 1 | Radius RP2 Maximum values 1 [mm] |
|---|---|---|---|---|---|
| 1 | -100 | 37.65408 | 56.48112 | 32.94732 | 61.18788 |
| 2 | -90 | 36.57824 | 54.86736 | 32.00596 | 59.43964 |
| 3 | -80 | 34.84488 | 52.26732 | 30.48927 | 56.62293 |
| 4 | -70 | 33.44368 | 50.16552 | 29.26322 | 54.34598 |
| 5 | -60 | 32.44296 | 48.66444 | 28.38759 | 52.71981 |
| 6 | -50 | 31.82656 | 47.73984 | 27.84824 | 51.71816 |
| 7 | -40 | 31.36472 | 47.04708 | 27.44413 | 50.96767 |
| 8 | -30 | 31.36472 | 47.04708 | 27.44413 | 50.96767 |
| 9 | -20 | 31.36472 | 47.04708 | 27.44413 | 50.96767 |
| 10 | -10 | 31.36472 | 47.04708 | 27.44413 | 50.96767 |
| 11 | 0 | 31.36472 | 47.04708 | 27.44413 | 50.96767 |
| 12 | 10 | 31.36472 | 47.04708 | 27.44413 | 50.96767 |
| 13 | 20 | 31.36472 | 47.04708 | 27.44413 | 50.96767 |
| 14 | 30 | 31.36472 | 47.04708 | 27.44413 | 50.96767 |
| 15 | 40 | 31.36472 | 47.04708 | 27.44413 | 50.96767 |
| 16 | 50 | 31.82656 | 47.73984 | 27.84824 | 51.71816 |
| 17 | 60 | 32.44296 | 48.66444 | 28.38759 | 52.71981 |
| 18 | 70 | 33.44368 | 50.16552 | 29.26322 | 54.34598 |
| 19 | 80 | 34.84488 | 52.26732 | 30.48927 | 56.62293 |
| 20 | 90 | 36.57824 | 54.86736 | 32.00596 | 59.43964 |
| 21 | 100 | 37.65408 | 56.48112 | 32.94732 | 61.18788 |

TABLE 13B

| Point | Angle α11 [degrees] | Radius RP1 Values 5 [mm] | Radius RP1 Minimum values 4 | Radius RP1 Maximum values 4 [mm] Radius | Radius RP1 Minimum values 3 | Radius RP1 Maximum values 3 [mm] Radius |
|---|---|---|---|---|---|---|
| 1 | -100 | 47.0676 | 44.71422 | 49.42098 | 42.36084 | 51.77436 |
| 2 | -90 | 45.7228 | 43.43666 | 48.00894 | 41.15052 | 50.29508 |
| 3 | -80 | 43.5561 | 41.378295 | 45.733905 | 39.20049 | 47.91171 |
| 4 | -70 | 41.8046 | 39.71437 | 43.89483 | 37.62414 | 45.98506 |
| 5 | -60 | 40.5537 | 38.526015 | 42.581385 | 36.49833 | 44.60907 |
| 6 | -50 | 39.7832 | 37.79404 | 41.77236 | 35.80488 | 43.76152 |
| 7 | -40 | 39.2059 | 37.245605 | 41.166195 | 35.28531 | 43.12649 |

TABLE 13B-continued

| Point | Angle α11 [degrees] | Radius RP1 Values 5 [mm] | Radius RP1 Minimum values 4 | Radius RP1 Maximum values 4 [mm] Radius | Radius RP1 Minimum values 3 | Radius RP1 Maximum values 3 [mm] Radius |
|---|---|---|---|---|---|---|
| 8  | −30 | 39.2059 | 37.245605 | 41.166195 | 35.28531 | 43.12649 |
| 9  | −20 | 39.2059 | 37.245605 | 41.166195 | 35.28531 | 43.12649 |
| 10 | −10 | 39.2059 | 37.245605 | 41.166195 | 35.28531 | 43.12649 |
| 11 | 0   | 39.2059 | 37.245605 | 41.166195 | 35.28531 | 43.12649 |
| 12 | 10  | 39.2059 | 37.245605 | 41.166195 | 35.28531 | 43.12649 |
| 13 | 20  | 39.2059 | 37.245605 | 41.166195 | 35.28531 | 43.12649 |
| 14 | 30  | 39.2059 | 37.245605 | 41.166195 | 35.28531 | 43.12649 |
| 15 | 40  | 39.2059 | 37.245605 | 41.166195 | 35.28531 | 43.12649 |
| 16 | 50  | 39.7832 | 37.79404  | 41.77236  | 35.80488 | 43.76152 |
| 17 | 60  | 40.5537 | 38.526015 | 42.581385 | 36.49833 | 44.60907 |
| 18 | 70  | 41.8046 | 39.71437  | 43.89483  | 37.62414 | 45.98506 |
| 19 | 80  | 43.5561 | 41.378295 | 45.733905 | 39.20049 | 47.91171 |
| 20 | 90  | 45.7228 | 43.43666  | 48.00894  | 41.15052 | 50.29508 |
| 21 | 100 | 47.0676 | 44.71422  | 49.42098  | 42.36084 | 51.77436 |

TABLE 13E

| Point | Angle α13 [degrees] | Radius RP2 Minimum values 6 [mm] | Radius RP2 Maximum values 6 [mm] |
|---|---|---|---|
| 1  | 0   | 45.89 | 48.24 |
| 2  | 10  | 44.58 | 46.87 |
| 3  | 20  | 42.47 | 44.65 |
| 4  | 30  | 40.76 | 42.85 |
| 5  | 40  | 39.54 | 41.57 |
| 6  | 50  | 38.79 | 40.78 |
| 7  | 60  | 38.23 | 40.19 |
| 8  | 70  | 38.23 | 40.19 |
| 9  | 80  | 38.23 | 40.19 |
| 10 | 90  | 38.23 | 40.19 |
| 11 | 100 | 38.23 | 40.19 |
| 12 | 110 | 38.23 | 40.19 |
| 13 | 120 | 38.23 | 40.19 |
| 14 | 130 | 38.23 | 40.19 |
| 15 | 140 | 38.23 | 40.19 |
| 16 | 150 | 38.79 | 40.78 |
| 17 | 160 | 39.54 | 41.57 |
| 18 | 170 | 40.76 | 42.85 |
| 19 | 180 | 42.47 | 44.65 |
| 20 | 190 | 44.58 | 46.87 |
| 21 | 200 | 45.89 | 48.24 |

The value of the radius RP2 at each point of the pitch curve CPR2, CPR2" is preferably comprised between the respective minimum 1 and maximum value 1, more preferably comprised between the respective minimum 2 and maximum value 2, more preferably comprised between the respective minimum 3 and maximum value 3, more preferably comprised between the respective minimum 4 and maximum value 4, more preferably comprised between the respective minimum 6 and maximum value 6 and even more preferably about equal to the respective value 5 indicated in table 13A or 13B or 13E.

The dimensions of the pitch profile CPR2; CPR2" of the second toothed profile 13, 13" can clearly vary by increasing or decreasing in scale the values of table 13A or 13B or 13E, but for example retaining its shape.

The pitch profiles defined by the Values 5 of tables 11A, 11B, 11E, 13A, 13B, 13E are shown in FIG. 6, engaged together between them.

Preferably the pitch profile CPR2; CPR2" is substantially symmetrical with respect to a plane passing through the axis of rotation AX13.

Preferably a portion of the pitch profile CPR2; CPR2" close to the plane of symmetry substantially has the shape of an arc of a circle, and subtends an angle α13C comprised between about 50-100° with reference to the axis of rotation AX13.

Preferably the second pitch profile CPR2; CPR2" overall subtends an angle α13 comprised between about 170°-240° with reference to the axis of rotation AX13, more preferably comprised between 190°-210° and even more preferably about equal to 200°.

In other embodiments not shown the first 11; 11" and the second toothed profile 13; 13" can have for example the shape of a full ellipse, a simple ellipse arc or also other forms.

Average radius RP1_m refers to the mean—preferably arithmetic, not weighted—on a round angle, or more generally on the angle subtended to the first toothed profile 11, 11" of the radius RP1.

Similarly, average radius RP2_m refers to the mean-preferably arithmetic, not weighted—on a round angle, or more generally on the angle subtended to the second toothed profile 13, 13" of the radius RP2.

Like in the embodiment of the accompanying figures, the first toothed profile 11, 11' forms the pinion of the gear, in the sense that its average radius RP1_m is equal to or less than the average radius RP2_m of the second toothed profile 13, 13".

Advantageously, while the pitch profiles of the first 11; 11" and of the second toothed profile 13; 13" rotate around the respective axes AX11, AX13, they are tangential to each other without mutual sliding; more particularly the second toothed profile 13; 13" is advantageously obtained by imposing the tangency without sliding on the pitch profile CPR1, CPR1" of the first toothed profile 11, 11".

Like in the embodiments of the accompanying figures, the second toothed profile 13; 13" can be interrupted at or near the points where the radius RP2 reaches its maximum.

Advantageously the first 11, 11" and the second toothed profile 13, 13" are such that their point of mutual contact PCN is at the maximum distance from the axis of rotation AX11 when it is at the minimum distance from the second axis AX13 or close thereto, like shown for example in FIG. 10, 20-22 or near said minimum distance.

Advantageously the first 11, 11" and the second toothed profile 13, 13" are such that their point of mutual contact PCN is at the minimum distance from the axis of rotation AX11 when it is at the maximum distance from the second axis AX13, like shown for example in FIG. 8, 12; 20, 22 or near said maximum distance.

Advantageously the second toothed profile 13" is provided with a stop tooth 130 configured to prevent the first toothed profile 11, 11" from continuing its rotation on the second profile 13" when the two profiles are meshed together (FIG. 16-18, 20A, 20B, 20C).

For this purpose, each stop tooth 130 has at least one side whose shape is substantially complementary—i.e. it substantially forms its positive cast- to the shape of the spaces of the teeth of the first toothed profile 11, 11", with shape tolerances sufficiently narrow so as to prevent the mutual rolling of the two toothed profiles meshed together (FIG. 16-18, 20A, 20B).

For this purpose at least part of the perimeter profile of each stop tooth 130 forms the positive cast of said spaces 110 with a shape tolerance TF preferably equal to or less than 0.5 millimetres in default with respect to the profile of the spaces 110, more preferably equal to or less than 0.1 millimetres, more preferably equal to or less than 0.05 millimetres, and even more preferably equal to or less than 0.025 millimetres (FIG. 20B, 20C).

The downward shape tolerance TF is measured in a direction perpendicular to the profile of the stop tooth 130 and/or of the corresponding space 110.

The downward shape tolerance TF at each point of the profile of the stop tooth 130 and/or of the corresponding space 110.

Aforesaid tolerance TF is preferably respected on a section of each stop tooth 130 which extends for at least 0.2 times the height HDN of said tooth 130, more preferably which extends for at least 0.3 times or 0.5 times or 0.7 times or 0.9 times the height HDN, and more preferably extends over the entire height HDN of the stop tooth 130 in question.

Preferably the second toothed profile 13" is provided with two stop teeth 130 (FIG. 16).

The remaining teeth 132 of the second toothed profile, like for example also those of the first profile 11, 11", can have involute profiles or in any case be common gear teeth configured to allow another meshed toothing to roll over it.

The stop teeth 130 are useful for making mechanical limit stops which—possibly in combination with other mechanical, electromechanical or electronic limit stops—prevent the first toothed profile 11, 11" from making excessive rotations on the second profile 13" so as to disengage therefrom.

The two stop teeth 130 can be found, for example, near or at the ends of the arch formed as a whole by the second pitch profile CPR2" (FIG. 20, 20A, 20B, 20C).

Preferably the transmission ratio ρ [rho] of the transmission unit 9 ranges from 0.1-4 times, between 0.15-1.61 times, between 0.1-3 times, between 0.19-1.29 times, between 0.25-2.5 times, between 0.25-0.97 times, between 0.3-1 times, between 0.37-0.65 times, considering in said intervals both the minimum and maximum values that the transmission ratio ρ [rho] reaches during the operation of a same transmission unit 9, 9".

The ratio between the maximum ρ_max and the minimum ρ_min value that the transmission ratio ρ [rho] of the transmission unit 9, 9" reaches during its operation is preferably comprised between 1-4 times, between 0.70-4.35 times, between 1-3 times, between 0.87-3.48 times, between 0.25-2.5 times, between 1.16-2.61 times, and for example equal to 3 times or 1.74 times.

FIG. 15 shows indicatively a possible trend of the reduction ratio (i.e. the inverse of the transmission ratio) of the reduction unit 9.

The rotation of the toothed profile 11, 11" is reported along the abscissa axis, the reduction ratio along the ordinate axis.

Advantageously, the trend of the reduction ratio shown in FIG. 15 gives a greater initial reduction (in the first phase of the motion of the wing 3), a lower central reduction (in the central phase of the motion of the wing 3) and a greater final reduction (in the third phase of the motion of the wing 3).

Said trend of the reduction ratio makes the torque required from the motor to move the wing 3 to be very uniform during the duration of the motion.

Figure 2:
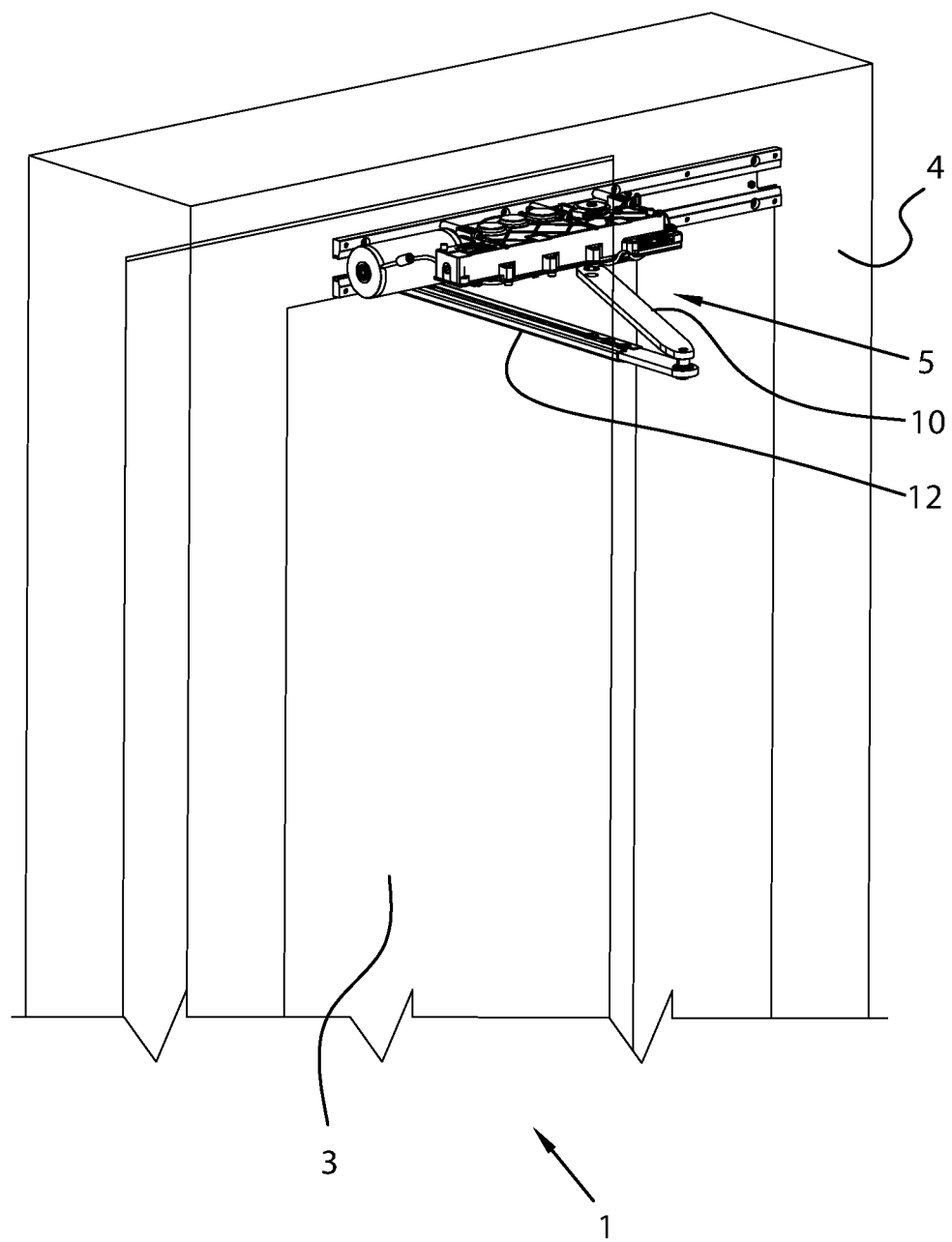
FIG. 2 shows a perspective view of a door connected by an articulated arm to the motorized drive of FIG. 1, in which the door is closed.
Figure 3:
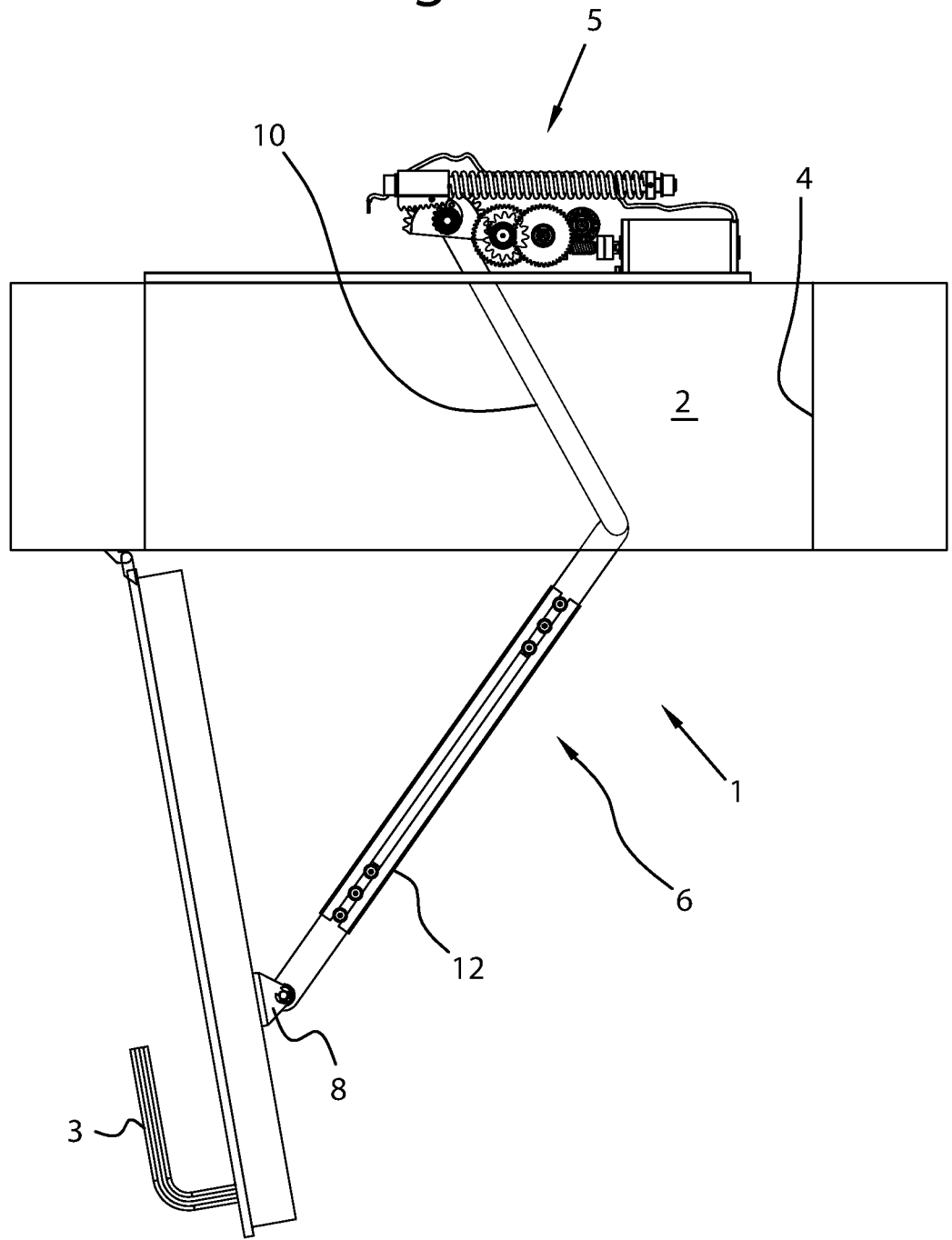
FIG. 3 shows a top view of the open door of FIG. 2.

Like for example in the embodiment of FIGS. 2, 3 the motorized drive 5; 5" can further comprise an actuating kinematic mechanism comprising in turn an articulated arm 6.

The articulated arm 6 can be fixed to the wing 3 and to the rest of the drive 5 without being able to slide with respect to the wing and the rest of the drive 5; for example it can be fixed to a bracket 8 integrally fixed to the wing 3 without being able to slide with respect thereto.

The articulated arm 6 can comprise for example two levers 10, 12 connected together by a hinge or other articulation.

In other embodiments not shown the articulated arm 6 can comprise a greater number of levers or more complex lever systems.

Like for example in the embodiments of FIGS. 4, 5; 18, 19 the motorized drive 5; 5" can further comprise an actuating kinematic mechanism comprising in turn a sliding guide 12' and an arm 10' sliding in said guide 12'.

The arm 10' can for example comprise a shoe or other slider engaged with the guide 12' so that it can slide along it.

Thanks to the greater uniformity of the resistant loads they offer, gears comprising at least one toothed wheel whose pitch profile is substantially different from a full circumference, from a simple arc of circle and it is not even straight can be advantageously applied not only to electric motors but also for example to spring motors or more generally to elastic energy motors such as for example those shown in FIGS. 6-9; 16.

Said spring or elastic energy motor 7' is configured to be driven respectively by a spring or more generally by elastic energy.

Said spring or elastic energy motor 7' can be used as a mechanical energy accumulator—for example elastic through the spring 19- to be used as an auxiliary motor in case of emergency, for example to partially or completely close a wing 3 in the event of fault or lack of power supply of the main motor—for example electric —7 of the motorized drive 5, 5" for example in the event of an electrical fault or in any case interruption of the power supply line of the motor 7.

The motor 7' comprises a reduction unit 9' in turn comprising a first 11' and a second toothed profile 13' engaged together to form a gear.

The first toothed profile 11' is configured to rotate on itself around a first axis of rotation AX11', for example because it is mounted on a respective shaft.

The second toothed profile 13' is instead configured to translate along a straight axis 13' and substantially acts as a rack.

The two axes AX11' and Ax13' are preferably perpendicular to each other.

Advantageously, the second toothed profile 13' has a pitch profile CPR2' substantially neither straight nor constituted by a simple arc of a circle.

As shown in FIGS. 7, 9 the pitch profile CPR2' of the second toothed profile 13' preferably has a slightly convex and curved shape.

More preferably the shape of the pitch profile CPR2' is approximated by points from the following table 13C or 13D or 13F, whose points are defined by the Cartesian coordinates L13'$i$, S$_i$ where L13'$i$ is the distance of a point P13'$i$ from the axis AX13', distance measured in a direction perpendicular to this axis, and S$_i$ is the distance of the point P13'$i$ from a point of origin OR of the axis AX13'.

TABLE 13C

| Point P13'$_i$ | Position S$_i$ along the axis X [mm] | Position L13'$_i$ Minimum values 2 [mm] | L13'$_i$ Maximum values 2 [mm] | Position L13'$_i$ Minimum values 1 | Position L13'$_i$ Maximum values 1 [mm] |
|---|---|---|---|---|---|
| 1 | 0 | 4.88184 | 7.32276 | 4.27161 | 7.93299 |
| 2 | 3.3124 | 5.35488 | 8.03232 | 4.68552 | 8.70168 |
| 3 | 6.6248 | 5.79752 | 8.69628 | 5.07283 | 9.42097 |
| 4 | 9.9372 | 6.20976 | 9.31464 | 5.43354 | 10.09086 |
| 5 | 13.2496 | 6.592 | 9.888 | 5.768 | 10.712 |

TABLE 13C-continued

| Point $P13'_i$ | Position $S_i$ along the axis X [mm] | Position $L13'_i$ Minimum values 2 [mm] | $L13'_i$ Maximum values 2 [mm] | Position $L13'_i$ Minimum values 1 | Position $L13'_i$ Maximum values 1 [mm] |
|---|---|---|---|---|---|
| 6 | 16.562 | 6.90512 | 10.35768 | 6.04198 | 11.22082 |
| 7 | 19.8744 | 7.27048 | 10.90572 | 6.36167 | 11.81453 |
| 8 | 23.1868 | 7.56984 | 11.35476 | 6.62361 | 12.30099 |
| 9 | 26.4992 | 7.84544 | 11.76816 | 6.86476 | 12.74884 |
| 10 | 29.8116 | 8.09992 | 12.14988 | 7.08743 | 13.16237 |
| 11 | 33.124 | 8.33624 | 12.50436 | 7.29421 | 13.54639 |
| 12 | 36.4364 | 8.5576 | 12.8364 | 7.4879 | 13.9061 |
| 13 | 39.7488 | 8.76736 | 13.15104 | 7.67144 | 14.24696 |
| 14 | 43.0612 | 8.96904 | 13.45356 | 7.84791 | 14.57469 |
| 15 | 46.3736 | 9.16608 | 13.74912 | 8.02032 | 14.89488 |
| 16 | 49.686 | 9.36192 | 14.04288 | 8.19168 | 15.21312 |
| 17 | 52.9984 | 9.55984 | 14.33976 | 8.36486 | 15.53474 |

TABLE 13D

| Point $P13'_i$ | Position $S_i$ along the axis X [mm] | Position $L13'_i$ transverse to the axis- Values 5 [mm] | Position $L13'_i$ Minimum values 4 [mm] | Position $L13'_i$ Maximum values 4 [mm] | Position $L13'_i$ Minimum values 3 [mm] | Position $L13'_i$ Maximum values 3 [mm] |
|---|---|---|---|---|---|---|
| 1 | 0 | 6.1023 | 5.797185 | 6.407415 | 5.49207 | 6.71253 |
| 2 | 3.3124 | 6.6936 | 6.35892 | 7.02828 | 6.02424 | 7.36296 |
| 3 | 6.6248 | 7.2469 | 6.884555 | 7.609245 | 6.52221 | 7.97159 |
| 4 | 9.9372 | 7.7622 | 7.37409 | 8.15031 | 6.98598 | 8.53842 |
| 5 | 13.2496 | 8.24 | 7.828 | 8.652 | 7.416 | 9.064 |
| 6 | 16.562 | 8.6314 | 8.19983 | 9.06297 | 7.76826 | 9.49454 |
| 7 | 19.8744 | 9.0881 | 8.633695 | 9.542505 | 8.17929 | 9.99691 |
| 8 | 23.1868 | 9.4623 | 8.989185 | 9.935415 | 8.51607 | 10.40853 |
| 9 | 26.4992 | 9.8068 | 9.31646 | 10.29714 | 8.82612 | 10.78748 |
| 10 | 29.8116 | 10.1249 | 9.618655 | 10.631145 | 9.11241 | 11.13739 |
| 11 | 33.124 | 10.4203 | 9.899285 | 10.941315 | 9.37827 | 11.46233 |
| 12 | 36.4364 | 10.697 | 10.16215 | 11.23185 | 9.6273 | 11.7667 |
| 13 | 39.7488 | 10.9592 | 10.41124 | 11.50716 | 9.86328 | 12.05512 |
| 14 | 43.0612 | 11.2113 | 10.650735 | 11.771865 | 10.09017 | 12.33243 |
| 15 | 46.3736 | 11.4576 | 10.88472 | 12.03048 | 10.31184 | 12.60336 |
| 16 | 49.686 | 11.7024 | 11.11728 | 12.28752 | 10.53216 | 12.87264 |
| 17 | 52.9984 | 11.9498 | 11.35231 | 12.54729 | 10.75482 | 13.14478 |

TABLE 13F

| Point $P13'_i$ | Position $S_i$ along the axis X [mm] | Position $L13'_i$ Minimum values 6 [mm] | Position $L13'_i$ Maximum values 6 [mm] |
|---|---|---|---|
| 1 | 0 | 5.95 | 6.25 |
| 2 | 3.3124 | 6.53 | 6.86 |
| 3 | 6.6248 | 7.07 | 7.43 |
| 4 | 9.9372 | 7.57 | 7.96 |
| 5 | 13.2496 | 8.03 | 8.45 |
| 6 | 16.562 | 8.42 | 8.85 |
| 7 | 19.8744 | 8.86 | 9.32 |
| 8 | 23.1868 | 9.23 | 9.70 |
| 9 | 26.4992 | 9.56 | 10.05 |
| 10 | 29.8116 | 9.87 | 10.38 |
| 11 | 33.124 | 10.16 | 10.68 |
| 12 | 36.4364 | 10.43 | 10.96 |
| 13 | 39.7488 | 10.69 | 11.23 |
| 14 | 43.0612 | 10.93 | 11.49 |
| 15 | 46.3736 | 11.17 | 11.74 |
| 16 | 49.686 | 11.41 | 11.99 |
| 17 | 52.9984 | 11.65 | 12.25 |

The value of the distance $L13'_i$ in each point $P13'_i$ is preferably comprised between the respective minimum 1 and maximum value 1, more preferably comprised between the respective minimum 2 and maximum value 2, more preferably comprised between the respective minimum 3 and maximum value 3, more preferably comprised between the respective minimum 4 and maximum value 4, more preferably comprised between the respective minimum 6 and maximum value 6 and even more preferably about equal to the respective Value 5 indicated in table 13C or 13D or 13F.

The dimensions of the pitch profile CPR2' of the rack 13' can clearly vary by increasing or decreasing in scale the values of table 13C or 13D or 13F, but for example retaining its shape.

Advantageously, the pitch profiles CPR1', CPR2' of the first 11' and of the second toothed profile 13', while the first rotates around the axis AX11' and the second slides along the axis AX13', are tangent to each other without mutual sliding; more particularly the second toothed profile 13' is advantageously obtained by imposing the tangency without sliding on the pitch profile CPR1' of the first toothed profile 11'.

The distance between the axis of rotation AX11' and a point of the pitch curve CPR1' of the toothing 11' in the present description is considered as the radius RP1' of the toothing associated with that point and the angular position all' [alpha 11'] of that point with respect to the axis AX11'.

The distance between the sliding axis AX13' and a point PCN of the pitch curve of the toothing 13' is measured according to a direction perpendicular to the axis AX13'.

As shown for example in FIGS. 7, 9, 20, 22 advantageously the radius RP1' at the beginning of the first toothed profile 11' has a minimum value, then progressively increases as the angular position all' of the point of the pitch profile considered with respect to the axis AX11' increases and reaches its maximum value for example at the end of the toothed profile 11' itself.

The radius RP1' can possibly reach its maximum value in a toothed section which during normal operation of the gear never engages with the second toothed profile 13'.

Preferably the first toothed profile 11' has a pitch profile CPR1' whose shape is approximated by points from the following table 11C or 11D or 11F, whose points are defined by the polar coordinates RP1', all'

TABLE 11C

| Point | Angle $\alpha 11'$ [degrees] | Radius RP1' Minimum values 2 [mm] | Radius RP1' Maximum values 2 [mm] | Radius RP1' Minimum values 1 [mm] | Radius RP1' Maximum values 1 [mm] |
|---|---|---|---|---|---|
| 1 | 0 | 15.2 | 22.8 | 13.3 | 24.7 |
| 3 | 20 | 14.5268 | 21.7902 | 12.71095 | 23.60605 |
| 5 | 40 | 13.57272 | 20.35908 | 11.87613 | 22.05567 |
| 7 | 60 | 12.9632 | 19.4448 | 11.3428 | 21.0652 |
| 9 | 80 | 12.45616 | 18.68424 | 10.89914 | 20.24126 |
| 11 | 100 | 12.02432 | 18.03648 | 10.52128 | 19.53952 |
| 13 | 120 | 11.66256 | 17.49384 | 10.20474 | 18.95166 |
| 15 | 140 | 11.33864 | 17.00796 | 9.92131 | 18.42529 |
| 17 | 160 | 11.04224 | 16.56336 | 9.66196 | 17.94364 |
| 19 | 180 | 10.76072 | 16.14108 | 9.41563 | 17.48617 |
| 21 | 200 | 10.48352 | 15.72528 | 9.17308 | 17.03572 |

TABLE 11D

| Point | Angle α11' [degrees] | Radius RP1' Values 5 [mm] | Radius RP1' Minimum values 4 [mm] | Radius RP1' Maximum values 4 [mm] | Radius RP1' Minimum values 3 [mm] | Radius RP1' Maximum values 3 [mm] |
|---|---|---|---|---|---|---|
| 1 | 0 | 19 | 18.05 | 19.95 | 17.1 | 20.9 |
| 3 | 20 | 18.1585 | 17.250575 | 19.066425 | 16.34265 | 19.97435 |
| 5 | 40 | 16.9659 | 16.117605 | 17.814195 | 15.26931 | 18.66249 |
| 7 | 60 | 16.204 | 15.3938 | 17.0142 | 14.5836 | 17.8244 |
| 9 | 80 | 15.5702 | 14.79169 | 16.34871 | 14.01318 | 17.12722 |
| 11 | 100 | 15.0304 | 14.27888 | 15.78192 | 13.52736 | 16.53344 |
| 13 | 120 | 14.5782 | 13.84929 | 15.30711 | 13.12038 | 16.03602 |
| 15 | 140 | 14.1733 | 13.464635 | 14.881965 | 12.75597 | 15.59063 |
| 17 | 160 | 13.8028 | 13.11266 | 14.49294 | 12.42252 | 15.18308 |
| 19 | 180 | 13.4509 | 12.778355 | 14.123445 | 12.10581 | 14.79599 |
| 21 | 200 | 13.1044 | 12.44918 | 13.75962 | 11.79396 | 14.41484 |

TABLE 11D

| Point | Angle α11' [degrees] | Radius RP1' Minimum values 6 [mm] | Radius RP1' Maximum values 6 [mm] |
|---|---|---|---|
| 1 | 0 | 18.53 | 19.48 |
| 3 | 20 | 17.70 | 18.61 |
| 5 | 40 | 16.54 | 17.39 |
| 7 | 60 | 15.80 | 16.61 |
| 9 | 80 | 15.18 | 15.96 |
| 11 | 100 | 14.65 | 15.41 |
| 13 | 120 | 14.21 | 14.94 |
| 15 | 140 | 13.82 | 14.53 |
| 17 | 160 | 13.46 | 14.15 |
| 19 | 180 | 13.11 | 13.79 |
| 21 | 200 | 12.78 | 13.43 |

The value of the radius RP1 at each point is preferably comprised between the respective minimum 1 and maximum value 1 indicated in the table, more preferably comprised between the respective minimum 2 and maximum value 2, more preferably comprised between the respective minimum 3 and maximum value 3, more preferably comprised between the respective minimum 4 and maximum value 4; more preferably comprised between the respective minimum 6 and maximum value 6 and even more preferably about equal to the respective value 5 indicated in table 11C or 11D or 11F.

The dimensions of the pitch profile CPR1 of the first toothed profile 11' can clearly vary by increasing or decreasing in scale the values of table 11C or 11D, but for example retaining its shape.

The pitch profiles defined by the Values 5 of the tables 11C, 11D, 13C, 13D are shown in FIG. 7, 16, 20-22 engaged together between them.

Transmission ratio of the gear—namely sprocket/rack pair—formed by the toothed profiles 11', 13' means in the present description the quantity p' [rho prime]=Δs/Δβ, where Δs is the linear displacement made by the rack 13' following a rotation equal to an angle β [beta] of the sprocket 11'.

The rotation Δβ [delta_beta] can be expressed for example in radians.

The greater the radius RP1' of the first toothed profile 11' at point PCN where the two toothed profiles 11', 13' engage, the greater the instantaneous linear displacement Δs [delta-s] of the rack.

Preferably the transmission ratio ρ' [rho] of the second reduction unit 9' is comprised between 0.021-0.192 times, or between 0.026-0.154 times, between 0.035-0.115 times or between 0.053-0.077, considering in these intervals both the minimum and maximum values that the transmission ratio ρ' [rho] reaches during the operation of a same reduction unit 9'.

The ratio between the maximum ρ'_max and the minimum ρ'_min value that the transmission ratio ρ' [rho] of the reduction unit 9' reaches during its operation is preferably comprised between 0.6-3.75 times, or between 0.75-3 times or between 1-2.25 times, and for example equal to 1.5 times.

FIG. 23 shows indicatively a possible trend of the reduction ratio (i.e. the inverse of the transmission ratio) of the reduction unit 9'.

The abscissa indicates the angular position—for example in degrees—of the sprocket 11', the ordinate the reduction ratio, i.e. the ratio between the variation of the angular position of the sprocket 11' and the linear displacement of the rack 13', for example the degrees per millimeter, [°/mm]).

Advantageously, the reduction ratio trend shown in FIG. 23 has been defined in such a way as to confer a lower initial reduction in the initial compression phase of the spring 19 and a greater final reduction in the final compression phase of the spring 19.

Eventually, the ratio between the maximum p' max and the minimum ρ'_min value that the transmission ratio ρ' [rho] of the transmission unit 9' reaches during its operation can be comprised between 1-5 times or between 1.5-2.5 times, and for example equal to 2 times.

The auxiliary motor 7' can comprise:
a helical spring 19;
a guide pin 15 inserted inside the spring 19 to keep it straight when it is compressed;
a slider 14 integral with the toothed profile 13' which can slide along the guide pin 15
a shoulder 16;
the toothed profile 11'.

The second toothed profile 13' is preferably integral with the slider 14 which is fixed to the first guide pin 15 so that it can slide along it.

In any case, the spring 19 preferably rests against the slider 14 and the shoulder 16, pressing against them and tending to move them away from each other.

The motorized drive 5 preferably comprises a casing 25 to which one or more of the toothed wheels or cams 11', 11", 13', 13", 15, 17, 23, the motor 7, 7', the spring 19 and/or the guide pin 15 are fixed and in which they are possibly contained.

The casing 25 may optionally form a box or other shell which encloses one or more of the toothed wheels or cams 11', 11", 13', 13", 15, 17, 23, the motor 7, 7', the spring 19 and/or the guide pin 15.

The drive 5, 5" advantageously comprises a system 24 for adjusting the preload force of the spring 19 or other elastic element (FIGS. 16, 16A).

Said preload adjustment system 24 advantageously comprises the shoulder 16 and an end 26 of the guide pin 15 itself.

For this purpose, the shoulder 16 is preferably obtained on a bush 27 coaxial with the guide pin 26 and with the axis x13'.

The outer sides of the end 26 of the pin 15, also called the adjustment end, are preferably threaded and the bush 27 is preferably screwed onto them, it also being provided with an internal thread coaxial with the guide pin 26 and the axis AX13'.

For this purpose, the bush 27 can for example also be an internally threaded nut, for example a hexagonal nut.

The end of the adjustment pin 26 and of the guide pin 15 is preferably connected to the casing 25 for example by means of the block 28 so as to be able to rotate on itself and around the axis AX13'.

The guide pin 15 has for example a hexagonal hollow seat 29—preferably coaxial with the pin 15 itself and with the axis x13'—through which the pin 15 can be rotated on itself and around the axis AX13'.

The hexagonal hollow seat 29 is preferably obtained at one end of the guide pin 15 indicated in the present description as "adjustment end".

The pin 15 is preferably fixed to the casing 25 so that it cannot slide along its axis AX13', for example because it is axially blocked at or in proximity to its end 33 opposite the adjustment end of the pin 15 (FIG. 16).

Preferably the bush 27 is fixed to the casing 25 so as to be able to translate along the adjustment pin 26 without however being able to rotate on itself and with respect to the casing 25.

For this purpose, the adjustment system of the preload 24 can comprise one or more pins or anti-unscrewing pins 31 and one or more corresponding slots 32.

Each slot 32, drawn with a dashed and double-dotted line in FIG. 16A, extends substantially parallel to the axis AX13' of the pin 15; each slot 32 can be obtained for example in the casing 25.

Each anti-unscrewing pin or pin 31 is fixed on the bush 27 so as to protrude radially therefrom, and is inserted in a respective slot 32.

By rotating the guide pin 15 axially on itself, the bush 27 is screwed or unscrewed on the pin 15 itself, making it slide axially along the pin 15 together with the shoulder 16 and thus adjusting the preload of the spring 19.

Said preload can be adjusted, for example, according to the inertia of the wing 3 to be operated.

In order to be able to be rotated on itself for example by means of a tool or with bare hands, the guide pin 15 can be provided with an engagement portion also different from the hexagonal hollow seat 29; said engagement portion may comprise, for example, a simple slot configured to house a flat blade screwdriver, a hollow seat for square wrenches or a notch for cross-tip screwdrivers.

The helical spring 19 can have, for example, a characteristic curve with linear elasticity, but it can also have a non-linear characteristic curve.

In other embodiments not shown, the helical metal spring 19 can be replaced or combined with other types of springs or other elastic elements made of materials, including non-metallic ones, for example elastomeric.

As shown for example in FIG. 1, the elastic energy motor 7' can advantageously be combined with the motorized drive 5.

For this purpose, the elastic energy motor 7' can for example drive the electric motor 7—or other main motor 7-and/or be driven by it, for example as will be described in more detail below.

For this purpose, the toothed profiles 13, 11' can be keyed onto the same shaft and/or integrally fixed to one another in such a way that the respective axes of rotation AX13 and AX11' coincide.

In other words, the second toothed profile 13 of the first reduction unit 9 and the first toothed profile 11' of the second reduction unit (9') can be made coaxial.

The toothed profiles 13, 11' are—that is, they can be—operated simultaneously by both the electric motor 7 and the elastic energy motor 7'.

An example of operation and use of the barrier 1, 1', 1", 1$^{III}$ and the relative drive 5, 5" described above is now described.

Assuming that the wing 3 is initially closed, and therefore substantially coplanar to the surface of the wall 2, in this condition the two toothed profiles 11, 13; 11", 13" are in the condition of FIG. 8, 16 with their contact point PCN at minimum distance from the axis of rotation AX11 and maximum distance from the axis of rotation AX13, so as to minimize the transmission ratio $\rho$ [rho]=RP1/RP2 of the transmission unit 9, 9".

Again in this condition, the two toothed profiles 11', 13' can be in the condition of FIG. 9, for example, where their contact point PCN' is at a minimum distance from the axis AX13' and at a maximum distance from the axis AX11'.

In this condition, the second toothed profile 13' applies to the rocket 11' a torque with maximum arm but with a minimum elastic force, since the spring is at the minimum degree of compression of its movements.

In the condition of FIG. 20, 20A, the stop tooth 130 of the second toothed profile 13" is jammed in a space between two adjacent teeth of the toothed profile 11", that is, it is in an end-of-stroke position.

With reference to FIGS. 8, 9, 20 to open the wing 3 the electric motor 7 rotates for example the first toothed profile 11 counterclockwise, and the second toothed profile 13 clockwise; with reference to FIG. 9, the first toothed profile 11' is rotated clockwise by the electric motor 7, sliding the slider 14 to the right along the guide pin 15.

The slider 14 thus begins to compress the spring 19 when the transmission ratio $\rho'=\Delta s/\Delta \beta$ is maximum or close to its maximum value, amplifying the elastic deformation force applied by the spring 19 to the slider to the maximum; however, said deformation force is minimal when the spring has just started to deform.

As the two toothed profiles rotate, the distance of their contact point PCN from the axis AX11 increases while the distance of the same point from the axis AX13 progressively decreases, consequently increasing the transmission ratio $\rho$ [rho]=RP1/RP2 of the transmission unit 9, 9".

This means that the motorized drive 5, 5" starts to open the relative wing 3 with a minimum transmission ratio $\rho$ [rho], the pinion 11, 11" applies an initially maximum driving and then progressively decreasing torque to the driven toothing 13, 13", rotating the toothing 13, 13" at an initially minimum and progressively increasing speed.

At the same time the first toothed profile 11' continues to rotate clockwise and the second profile 13' continues to slide to the right, continuing to compress the spring 19.

The transmission ratio $\rho'$ decreases progressively, and this fact is at least partially compensated by the progressive increase in the elastic force with which the spring 19 opposes the displacement of the slider 14 as it is deformed.

In the condition of FIG. 10, 21 the distance of the contact point PCN of the profiles 11, 13; 11", 13" from the axis AX11 substantially reaches its maximum value, while the distance of the point PCN from the axis AX13 reaches its minimum value, causing the transmission ratio ρ [rho] to reach its maximum value.

The condition of FIG. 10, 21 is particularly suitable for the intermediate phase between the acceleration and deceleration phases of the rotation of the wing, whether it is opening or closing: the wing does not require further acceleration, on the contrary it is about to be braked and therefore it requires only a minimum driving torque from the motor 7, for example just sufficient to overcome the internal frictions at the hinges of the wing and in general the frictions that oppose the movement of the wing 3.

In this phase it is sufficient that the motor 7 rotates the wing 3 at the maximum possible speed by applying low driving torques and imparting on it almost zero or very low accelerations, since the wing 3 is now launched and can continue its motion even only thanks to its inertia.

At the same time the auxiliary motor 7' is in the condition of FIG. 11, in which with respect to Figure the first toothed profile 11' is rotated more clockwise, the slider 14 is more displaced to the right, the spring 19 is more compressed and the transmission ratio ρ' has decreased.

Once the phase of FIG. 10, 21 has been overcome, the wing 3 must be decelerated because it is approaching the end of its stroke, that is, for example, to the fully open position.

It is therefore useful that the motor 7 applies a progressively increasing braking torque to the wing 3, at the same time slowing down its rotation, and precisely for this purpose after the condition of FIG. 10, 21 the distance of the contact point PCN of the profiles 11, 13; 11", 13" from the axis AX11 decreases again, while the distance of the point PCN from the axis AX13 increases again, progressively and reducing again the transmission ratio ρ [rho].

In the subsequent condition of FIG. 12, 22 corresponding for example to a condition of full opening of the wing 3, the distance of the contact point PCN of the profiles 11, 13; 11", 13" from the axis AX11 has reached a second minimum value, while the distance of the point PCN from the axis AX13 has reached its maximum value again, making the transmission ratio ρ [rho] reach its minimum value again.

This means that switching from the condition of FIG. 10; 21 to that of FIG. 12; 22 the pinion 11 is able to energetically brake the wing 3 with a progressively increasing torque, imposing a progressively decreasing speed on it.

In the condition of FIG. 12; 22 the motor can for example stop the rotation of the toothed profiles 11, 13; 11", 13" by correspondingly stopping the wing 3 for example in a fully open position.

In the condition of FIG. 22, the stop tooth 130 is jammed or in any case blocked in the space of the toothed profile 11" preventing the latter from rolling further on the first toothed profile 13"; in other words, the tooth 130 is in a second end-of-stroke position.

While the gear 11, 13; 11", 13" is in the condition of FIG. 12, the gear 11', 13' is in that of FIG. 13 in which, with respect to FIG. 12, the first toothed profile 11' is further rotated clockwise, the slider 14 is further displaced to the right, the spring 19 is compressed to the maximum and the transmission ratio ρ' is at its minimum value.

The work of the electric motor 7 served in part to open the wing 3, in part to store elastic energy in the spring 19.

The reduction unit 9, 9" and more generally the gear comprising the toothed profiles 11, 13; 11", 13" are therefore able to achieve a lower transmission ratio ρ [rho]=RP1/RP2 in the initial acceleration and final deceleration phases of the wing 3, and a greater transmission ratio ρ [rho] in the central phase of the motion of the wing, making the resistant torque applied to the motor 7 more uniform with respect to a transmission unit provided exclusively with gears with circular toothed profiles and without a gearbox.

At the same time, the progressive increase in the compression force of the spring 19 is at least partially compensated by the progressive decrease in the transmission ratio ρ', which tends to make the resistant torque that the electric motor 7 must overcome in order to compress the spring 19 more constant.

In normal operating conditions, when the electric motor 7 closes the wing 3 it is helped by the spring 19 which decompresses, giving the elastic energy stored during the door opening phase back.

Again in normal operating conditions, the wing 3 can be kept open by the torque generated by the electric motor 7 which is kept constantly powered.

In the event of an anomaly, for example in the event of a fault in the power supply line of the electric motor 7, the elastic energy motor 7' advantageously operates the wing 3 by closing it again.

In doing so, the elastic energy motor 7' can for example drag the electric motor 7 and the gears and/or worm screws 15, 17, 19, 21, 23 of the relative speed reducer into rotation.

The user can open the door 3 by hand, loading the spring 19.

In doing so, the user can for example drag the electric motor 7 and the gears and/or worm screws 15, 17, 19, 21, 23 of the relative speed reducer into rotation.

In the previous example of operation, the motorized drive 5 has been configured so that in the event of a failure, the elastic energy auxiliary motor 7' tends to close the door or other movable barrier 3.

Alternatively, the drive 5 can be configured so that in case of failure the auxiliary motor 7' tends to open the door or other movable barrier 3; this configuration is useful for example to open a series of doors of a building in case of anomaly, to favour a natural convection creating a chimney effect.

In this case the electric motor 7 loads the spring 19 by closing the door 3, and is helped by the spring 19 when it opens the door 3.

Therefore in general in the mechanism of FIG. 1 the progressive increase of the radius RP1' corresponding to the point of contact between the two toothed profiles 11', 13' partially compensates for the progressive decrease in the thrust of the spring 19, and the wing 3 is driven by the auxiliary motor 7' with a more constant driving torque.

More generally, from the preceding description it is clear that the transmission units 9, 9', 9" with a variable transmission ratio, having an extremely simple mechanical construction, are able to make the resistant torque applied to the motor of a drive of a movable barrier such as for example the rotating wing of a door, main door, gate or swing shutter, or even the sliding wing of a wall or sliding partition much more uniform.

Having to overcome a more uniform resistant torque, the motor 7 can have a smaller size; for example, the authors of the present invention have succeeded in reducing the size and rating power of the electric motors 7 by about half, for the same opening time of the wing 3.

For the same installed electrical power of the motor 7, the maximum rotation speed can be considerably reduced, for example halved, thereby reducing the vibrations and noise of speed of the reduction unit.

By operating more often in conditions closer to optimal conditions, said motor can operate with greater efficiency, and consequently less heating and stress in the case of an electric motor 7.

For the same reasons, the entire motorized drive 5, 5" can be sized more lightweight and less massively than if it had a fixed transmission ratio.

In particular with an actuator 5, 5" with the same installed electrical power, the speed and consequently also the time for opening and closing the wing 3 according to the weight of the latter can be adjusted in a wider range—for example double—with respect to a transmission with front gears with constant transmission ratio.

The resistant torque applied to the motor of a drive of a movable barrier of aforesaid type can be made even more uniform by the possible articulated arm 6.

FIG. 14 shows indicatively a possible trend of the reduction ratio—that is the inverse of the transmission ratio—of a single articulated arm 6 formed by two levers hinged depending on the opening angle of the wing of a door, such as for example the door 3 of FIG. 2.

The rotation of the wing 3 is shown along the abscissa axis, the reduction ratio along the ordinate axis.

The transmission ratio of the arm 6 contributes to making the overall transmission ratio of the motorized drive 5; 5" more similar to the desired speed profile, with an initial section of acceleration of the wing, an intermediate section at almost constant speed of the wing and a final section of deceleration of the wing, which corresponds to applying to the electric motor 7 a very constant resistant torque as the opening angle of the wing 3 changes.

On the other hand, a kinematic mechanism with a shoe-like arm has an almost uniform transmission ratio depending on the opening angle of the wing.

To obtain the desired speed profile, the motor is forced to impose high torques in acceleration and deceleration.

Due to the uniform transmission ratio of the kinematic mechanism with shoe-like arm, a manufacturer is often obliged to declare lower values of maximum inertia of the wing with respect to a kinematic mechanism with articulated arm.

Advantageously, with the introduction of the variable transmission ratio of the reduction unit 9, 9", on the other hand, it is possible to guarantee the desired speed profile also by using a kinematic mechanism with shoe-like arm by applying a constant resistant torque to the motor.

Furthermore, the reduction unit 9; 9" allows to declare a single value of maximum inertia of a wing that can be operated with a motorized drive, regardless of whether the drive includes a kinematic mechanism with articulated arm or it is shoe-like.

An advantage of the mechanical energy accumulator with spring and variable transmission ratio comprising the motor 7' and the reduction unit 9', compared to an actuator with fixed transmission ratio, is to provide a movement torque 3 of the wing substantially constant throughout its movement, and for example sufficient to ensure that the wing, in the final stop position when closing, has a high residual torque for operating mechanical lock bolts, as is often required.

At the same time it is required that, in the absence of voltage in the power supply system of the electric motor 7 of the main actuator, it is possible to manually open the wing with a constant torque or that in any case it is not desired that the torque to be performed manually increases in the subsequent opening phases of the wing.

With a rack and pinion transmission system with constant transmission ratio, in the fully open end position of the wing 3 the spring 19 would be compressed to the maximum and the torque transmitted by it would be maximum; to open the wing 3 manually, it would be necessary to apply a higher and higher torque to it which would give the perception that the drive 5 is being blocked, opposing the opening.

With an auxiliary actuator 7', 9' with variable transmission ratio, said unpleasant perception is not present.

Furthermore, the auxiliary actuator 7', 9' can have an overall length, according to the sliding direction FC of the rack 13', considerably reduced—for example by about 30%—with respect to a transmission with fixed ratio considering that the average torque transmitted in the system with fixed ratio is equal to the constant torque transmitted by the system with variable ratio.

The toothed gears 11, 13; 11', 13'; 11", 13" previously described are capable of reproducing a wide range of movements of a wing, in particular reproducing a wide range of speed profiles, providing high torques and low actuation speeds when high accelerations or decelerations are desired, for example at the beginning and at the end of a closing or opening movement of a rotating or sliding wing 3, and weak torques and high speeds for example in the central phase of opening or closing a rotating or sliding wing or in any case in phases of the movement in which an almost constant speed of the wing is desired.

The motorized barrier 1, 1', 1", 1''' advantageously comprises a logic control unit, comprising for example one or more electronic microprocessors, and one or more remote control device through which a user can remotely control the opening or closing of the wing or wings 3 by sending appropriate command signals to the logic control unit.

Said command signals can be sent for example by radio or acoustic waves, or again be for example optical signals.

The embodiments described above are susceptible to numerous modifications and variants, without departing from the scope of the present invention.

Every reference in this description to "an embodiment", "an embodiment example" means that a particular feature or structure described in relation to such embodiment is included in at least one embodiment of the invention and in particular in a specific variant of the invention as defined in a main claim.

The fact that such expressions appear in various passages of the description does not imply that they are necessarily referred solely to the same embodiment.

In addition, when a feature, element or structure is described in relation to a particular embodiment, it is observed that it is within the competence of the person skilled in the art to apply such feature, element or structure to other embodiments.

Numerical references that differ only in the different superscripts, e.g. 21', 21", 21''' when not otherwise specified indicate different variants of an element called in the same way.

Furthermore, all of the details can be replaced by technically equivalent elements.

For example, the materials used, as well as the dimensions thereof, can be of any type according to the technical requirements.

It must be understood that an expression of the type "A comprises B, C, D" or "A is formed by B, C, D" also comprises and describes the particular case in which "A is made up of B, C, D".

The expression "A comprises an element B" unless otherwise specified is to be understood as "A comprises one or more elements B".

References to a second, third, fourth entity and so on do not necessarily imply the existence of a first, second and third entity respectively but they are simply a conventional name to indicate that an nth entity might be different and distinct from any other 1, 2th . . . (n−1), (n+1)-th entities, if they existed.

The examples and lists of possible variants of the present application are to be construed as non-exhaustive lists.

Barzanò & Zanardo Milano S.p.A.

What is claimed is:

1. Motorized drive configured to open and/or close a wing of a barrier wherein the motorized drive comprises an electric motor, a first reduction unit through which the electric motor can operate the wing opening and closing, an auxiliary elastic energy motor; and wherein:
    the first reduction unit comprises a first and a second toothed profile engaging together, thus forming a gear with a variable transmission ratio depending on the angular and linear position of at least one of the two toothed profiles;
    at least one of the first and of the second toothed profile forms at least one toothed section having a pitch profile which is substantially non-circular or not formed by a simple arc of a circle or a straight line;
    the auxiliary elastic energy motor comprises a second reduction unit which in turn comprises a first and a second toothed profile engaged together to form a gear;
    the first toothed profile of the second reduction unit and the second toothed profile of the first reduction unit are configured to be operated both by the electric motor and by the auxiliary elastic energy motor;
    the motorized drive is configured for operating the closure of the wing through the second reduction unit;
    the auxiliary elastic energy motor can be connected to the wing through the second reduction unit;
    the first toothed profile of the second reduction unit, having a first toothed profile axis of rotation, and the second toothed profile of the first reduction unit, having a second toothed profile axis of rotation, are keyed onto the same shaft or integrally fixed to one another in such a way that the first toothed profile axis of rotation and the second toothed profile axis of rotation are coaxial; and
    the second toothed profile of the auxiliary elastic energy motor substantially acts as a rack.

2. The motorized drive according to claim 1, wherein the first toothed profile is configured to rotate around a third rotation axis that is located within the first toothed profile, and has a pitch profile having substantially the same shape, regardless of scale, as of a pitch profile whose points are at a distance from said third rotation axis comprised between the Minimum Values 1 and the Maximum Values 1 indicated in Table 11C, wherein said distance and said pitch profiles are considered in a plane perpendicular to the third axis of rotation.

3. The motorized drive according to claim 2, wherein the first toothed profile has a pitch profile having substantially the same shape, regardless of scale, as of a pitch profile whose points are at a distance from this said rotation axis of rotation comprised between the Minimum Values_2 and the Maximum Values_2 indicated in Table 11C.

4. The motorized drive according to claim 2, wherein the first toothed profile has a pitch profile having substantially the same shape, regardless of scale, as of a pitch profile whose points are at a distance from said third rotation axis comprised between the Minimum Values_3 and the Maximum Values_3 indicated in Table 11D.

5. The Motorized drive according to claim 2 configured to store mechanical energy during the opening of the wing by activating:
    an initial phase in which the second reduction unit transfers mechanical energy from the wing to the auxiliary motor by operating the latter with a reduction ratio;
    a final phase in which the second reduction unit transfers mechanical energy from the wing to the auxiliary motor by operating the latter with a greater reduction ratio than the initial phase.

6. The Motorized drive according to claim 2, configured to transfer mechanical energy during the closing of the wing by activating:
    an initial phase in which the second reduction unit transfers mechanical energy from the auxiliary motor to the wing with a reduction ratio;
    a final phase in which the second reduction unit transfers mechanical energy from the auxiliary motor to the wing with a lower reduction ratio than the initial phase.

7. The motorized drive according to claim 1, wherein the second toothed profile is configured to slide along a fourth axis and has a pitch profile having substantially the same shape, regardless of scale, as of a pitch profile whose points are at a distance from a fifth axis comprised between the Minimum Values 1 and the Maximum Values 1 indicated in Table 13C, wherein the fifth axis is parallel with respect to said fourth axis and said distance and said pitch profiles are considered in a plane passing through said fifth axis.

8. The motorized drive according to claim 7, wherein the second toothed profile has a pitch profile having substantially the same shape, regardless of scale, as of a pitch profile whose points are at a distance from flail the fifth axis comprised between the Minimum Values_2 and the Maximum Values_2 indicated in Table 13C.

9. The motorized drive according to claim 7, wherein the second toothed profile has a pitch profile having substantially the same shape, regardless of scale, as of a pitch profile whose points are at a distance from the fifth axis comprised between the Minimum Values_3 and the Maximum Values_3 indicated in Table 13D.

10. The motorized drive according to claim 1, wherein the first and/or the second toothed profile has a pitch profile whose shape is chosen from the following group: elliptic shape, elliptical arc shape, parabolic shape, hyperbolic shape, oval shape, curvilinear and oblong shape, lobed shape with one or more lobes, polynomial, sinusoidal and logarithmic shape.

11. The motorized drive according to claim 1, wherein the first toothed profile substantially acts as a pinion or a sprocket.

12. The motorized drive according to claim 1, wherein both the first and the second toothed profile form at least one toothed section having a pitch profile which is substantially non-circular and neither exclusively an arched circle nor straight.

13. The motorized drive according to claim 1, wherein the second toothed profile comprises a section whose pitch profile has been obtained by imposing the tangency without sliding on the pitch profile of the first toothed profile.

14. The motorized drive according to claim 1, wherein the first toothed profile is delimited by a first and a second end, the first and the second toothed profile engage in at least one point of mutual contact and have shapes such that the radius of the first toothed profile aligned with said mutual contact point progressively increases as the point of mutual contact moves towards said first or second end.

15. The motorized drive according to claim 1, wherein the radius of the first toothed profile reaches its a minimum value at a first end of the first toothed profile.

16. The motorized drive (according to claim 1, wherein the radius of the first toothed profile reaches its a maximum value at a second end of the first toothed profile.

17. The motorized drive according to claim 1, wherein the auxiliary motor is a motor driven by the release force of a spring or other elastic and/or pneumatic or energy storage element.

18. The Motorized drive according to claim 1, wherein the auxiliary motor is driven by the release force of a spring or of another elastic element, and wherein the spring or other elastic element are configured to operate the second toothed profile by pushing or pulling the second toothed profile longitudinally relative to the second toothed profile.

19. The Drive according to claim 1, comprising a preload adjustment system configured to adjust the preload force of the spring or another elastic element.

20. The Drive according to claim 19, wherein the preload adjustment system comprises a guide pin configured to be rotated on itself so as to adjust the preload force of the spring or another elastic element.

* * * * *